(12) United States Patent
Zhu

(10) Patent No.: US 10,387,924 B2
(45) Date of Patent: Aug. 20, 2019

(54) SYSTEM, COMPUTER-READABLE MEDIUM, AND METHOD FOR MOBILE DEVICE M2M GATEWAY

(71) Applicant: Cellco Partnership, Basking Ridge, NJ (US)

(72) Inventor: Lily Zhu, Parsippany, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 1079 days.

(21) Appl. No.: 13/902,134

(22) Filed: May 24, 2013

(65) Prior Publication Data

US 2014/0351099 A1 Nov. 27, 2014

(51) Int. Cl.

| G06Q 30/02 | (2012.01) |
| H04W 4/70 | (2018.01) |
| G06Q 10/08 | (2012.01) |
| G06Q 20/18 | (2012.01) |
| G06F 21/35 | (2013.01) |
| G06Q 30/06 | (2012.01) |
| H04W 84/18 | (2009.01) |
| H04W 4/80 | (2018.01) |

(52) U.S. Cl.
CPC ......... *G06Q 30/0283* (2013.01); *G06F 21/35* (2013.01); *G06Q 10/087* (2013.01); *G06Q 20/18* (2013.01); *G06Q 30/0601* (2013.01); *H04W 4/70* (2018.02); *H04L 2463/102* (2013.01); *H04W 4/80* (2018.02); *H04W 84/18* (2013.01)

(58) Field of Classification Search
CPC ....................................................... G06Q 30/06
USPC ............................................... 705/26.1–27.2
See application file for complete search history.

(56) References Cited

U.S. PATENT DOCUMENTS

| 2004/0034684 A1* | 2/2004 | Payne | G06Q 10/10 709/201 |
| 2008/0077527 A1* | 3/2008 | Choe | G06Q 20/20 705/44 |
| 2011/0202881 A1* | 8/2011 | Singh | G06F 21/6245 715/833 |
| 2012/0029691 A1* | 2/2012 | Mockus | G06Q 20/18 700/232 |
| 2013/0123068 A1* | 5/2013 | Sultan | A63B 24/0062 482/2 |

OTHER PUBLICATIONS

Waldén, Sari, and Erkki Mäkinen. "On Accepting Smart Environments at User and Societal Levels." Universal Access in the Information Society 13.4 (2014): 449-69. ProQuest. Web. Mar. 14, 2019.*

* cited by examiner

*Primary Examiner* — Jeffrey A. Smith
*Assistant Examiner* — Jennifer V Lee

(57) ABSTRACT

A device may determine an occurrence of a user interaction. The device may obtain information associated with the user interaction. The device may detect a mobile device transmitting a particular identifier. The mobile device may be associated with the user interaction. The device may establish a connection with the mobile device based on the particular identifier. The device may transmit the information associated with the user interaction to the mobile device to cause the mobile device to transmit the information associated with the user interaction to a server device associated with the device.

20 Claims, 24 Drawing Sheets

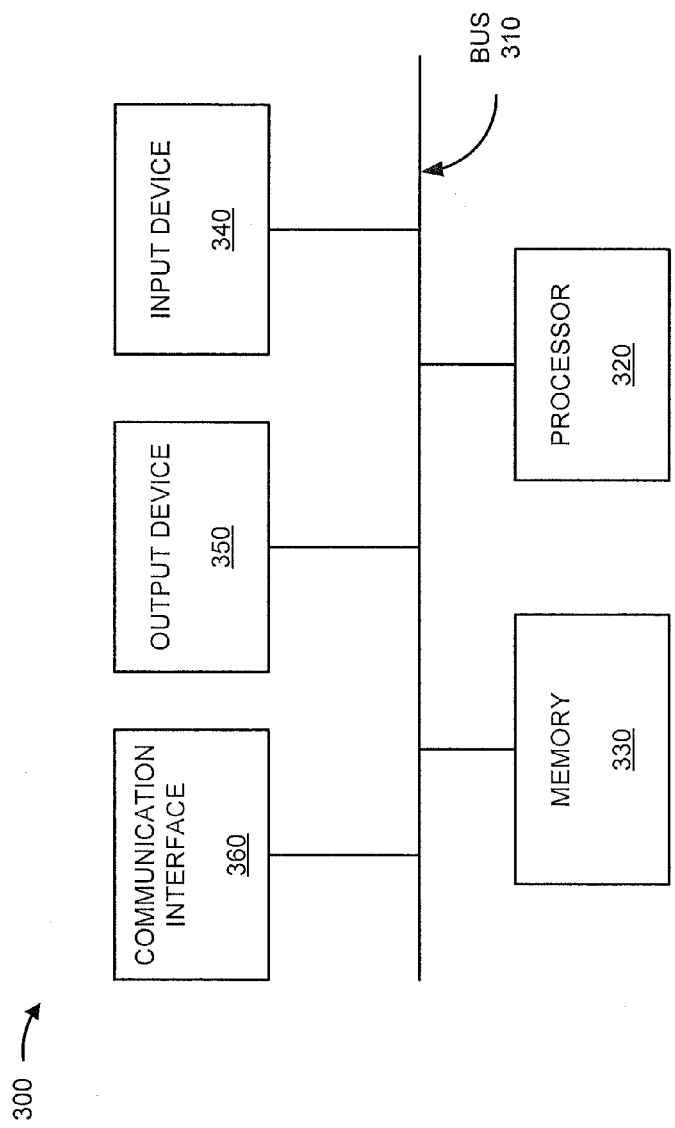

| DEVICE ID 405 | DEVICE TYPE 410 | CUSTOMER ID 415 | DATA TYPE 420 | DATA 425 | | | |
|---|---|---|---|---|---|---|---|
| VM123 | VENDING MACHINE | CUSTOMER1 | INVENTORY DATA | PRODUCT ID | CURRENT QUANTITY | EVENT: | ACTION: |
| | | | | DRINK1 | 25 | QTY=5 | NOTIFY VIA EMAIL |
| | | | | DRINK2 | 40 | QTY=15 | NOTIFY VIA EMAIL |
| TM456 | TREADMILL | CUSTOMER2 | FITNESS DATA | EVENT: | | ACTION: | |
| | | | | RECEIVE FITNESS DATA | | SEND FITNESS DATA TO FITNESS APPLICATION SERVER | |
| MD789 | SMART PHONE | CUSTOMER2 | INCENTIVE DATA | VENDOR ID: | | AMOUNT OF DATA TRANSMITTED: | DATE |
| | | | | VENDOR1 | | 125kb | MMDDYYYY |

FIG. 4

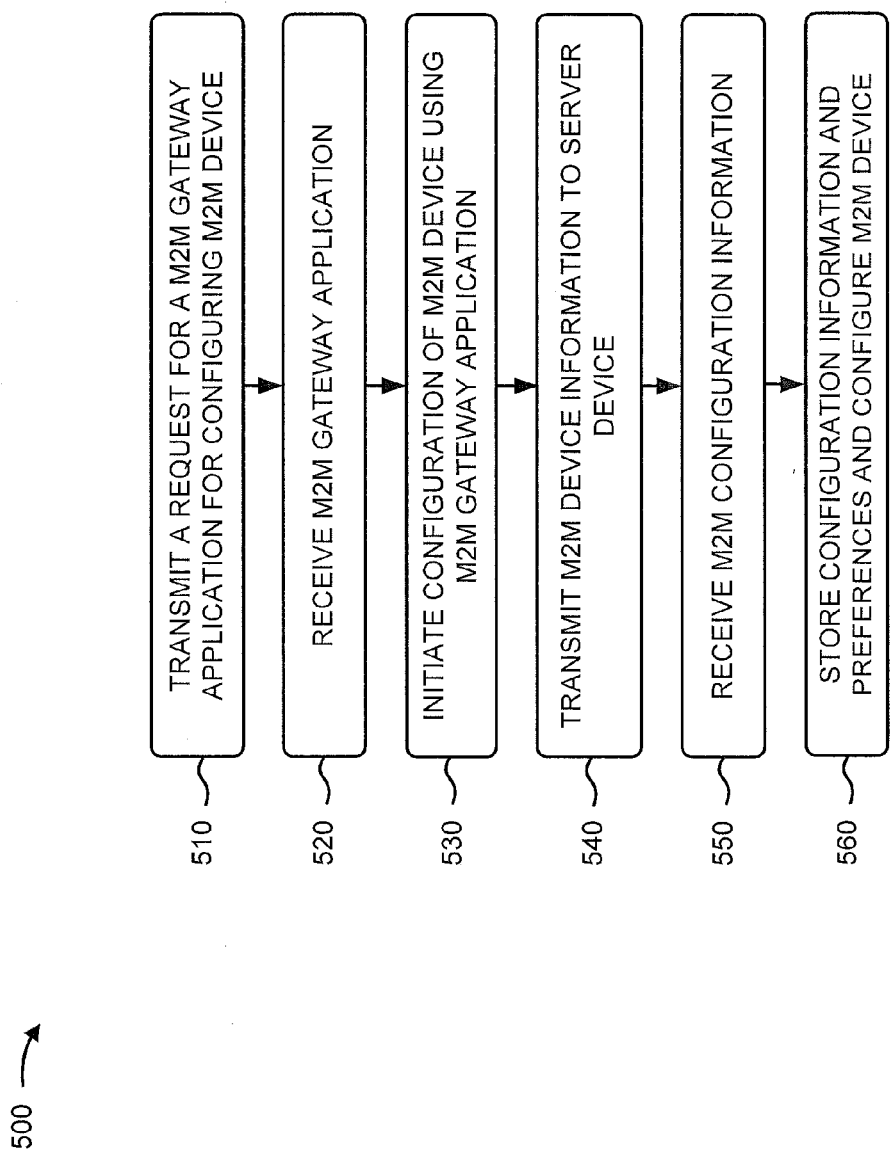

600

M2M DEVICE CONFIGURATION

USER NAME: | CUSTOMER1

M2M DEVICE ID: | TREADMILL

TYPE OF DATA: | FITNESS ▽

DATA TO BE TRANSMITTED:

- TIME ☐
- DISTANCE ☐
- AVERAGE PACE ☐
- AVERAGE HEART RATE ☐

DISPLAY DATA BEFORE SENDING ☐
STORE A COPY OF FITNESS DATA ☐

[BACK] [MORE CONFIGURATION] [SUBMIT]

M2M APPLICATION DEVICE

FIG. 6

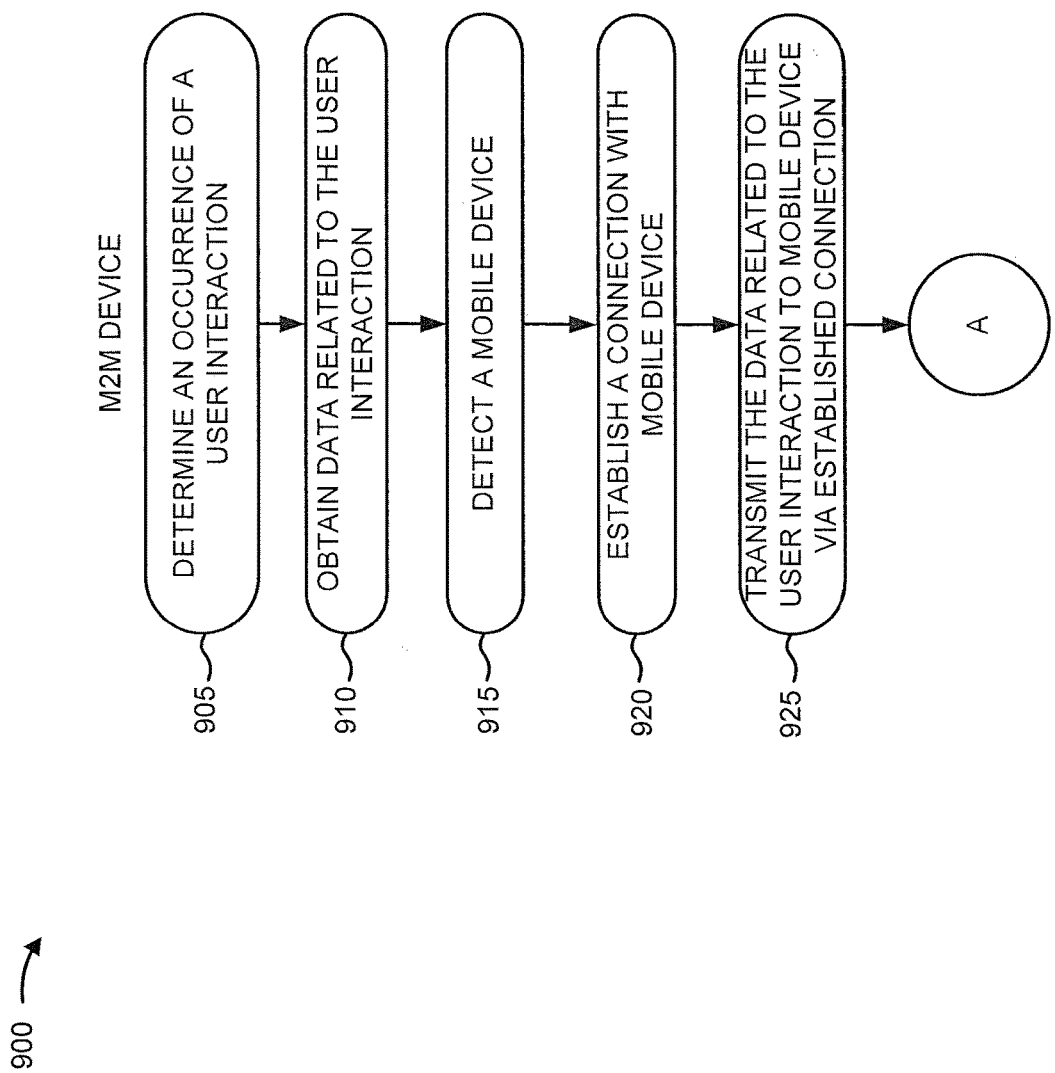

1000 →

| DEVICE ID | SERVER DEVICE |
|---|---|
| TREADMILL | SERVER1 |
| ELLIPTICAL | SERVER1 |
| VENDING MACHINE | SERVER2 |
| ATM | SERVER3 |

210

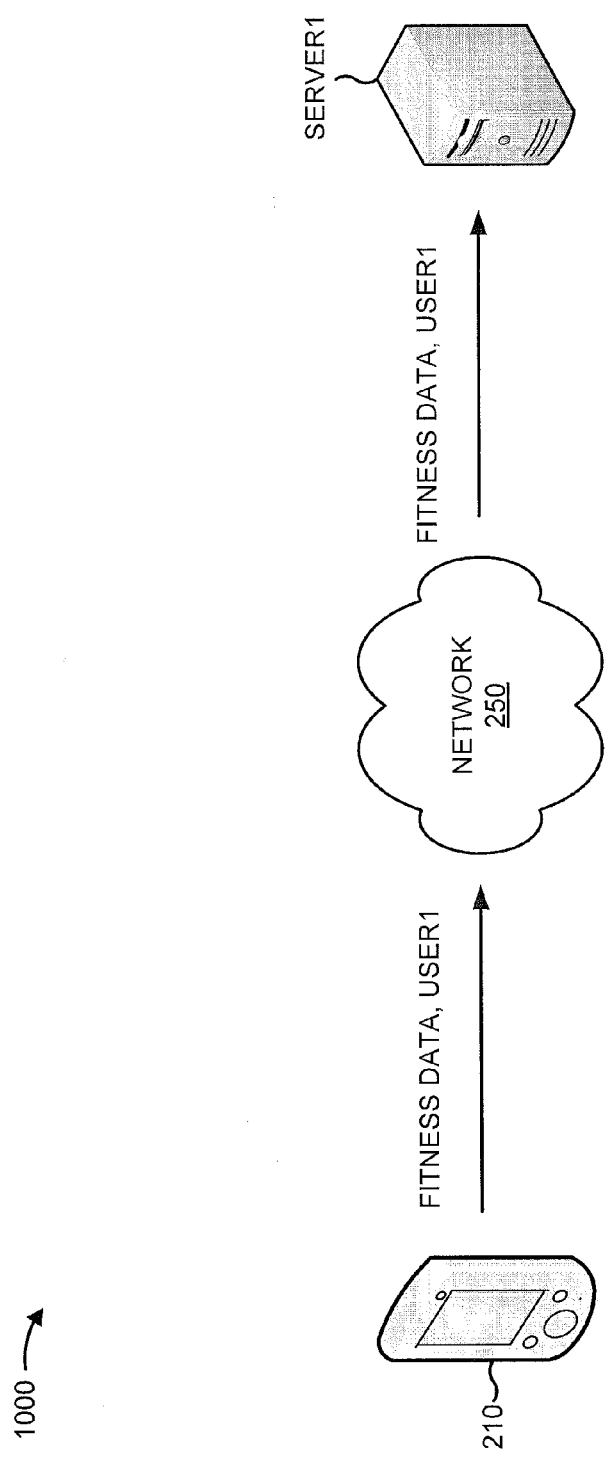

| DATA TYPE 420 | DATA 425 | |
|---|---|---|
| | EVENT: | ACTION: |
| FITNESS DATA | RECEIVE FITNESS DATA | SEND FITNESS DATA TO FITNESS APPLICATION SERVER |

USER1

| DEVICE ID | SERVER DEVICE |
|-----------|---------------|
| VM1 | SERVER1 |
| VM2 | SERVER1 |
| VM3 | SERVER2 |
| VM4 | SERVER3 |

230

SYSTEM, COMPUTER-READABLE MEDIUM, AND METHOD FOR MOBILE DEVICE M2M GATEWAY

BACKGROUND

Machine-to-Machine ("M2M") communications may refer to technologies that allow devices to communicate with one another over wired or wireless networks. M2M communications can be found in a number of economic sectors, such as security, product tracking, health care, and remote monitoring and diagnostics.

BRIEF DESCRIPTION OF THE DRAWINGS

FIG. 3 illustrates example components of a device that may be used within the environment of FIG. 2 according to one or more implementations described herein;

FIG. 4 is a diagram of an example data structure for storing M2M device data;

FIG. 5 is a flow chart of an example process for configuring an M2M device;

FIG. 6 is a diagram illustrating an example user interface that may be used in connection with the process described in connection with FIG. 5;

FIGS. 9A-9C are a flow chart of an example process for transmitting M2M device data via a smart phone M2M gateway system; and FIGS. 10A-10G and FIGS. 11A-11D are diagrams illustrating examples of the process described with respect to FIGS. 9A-9C.

DETAILED DESCRIPTION OF PREFERRED EMBODIMENTS

The following detailed description refers to the accompanying drawings. The same reference numbers in different drawings may identify the same or similar elements.

A machine-to-machine ("M2M") device may be included on a consumer device, such as, for example, a vending machine, an exercise apparatus, etc., to capture data related to an interaction between a user and the consumer device. In some implementations, in order to reduce costs, the M2M device may only be able to communicate via short range communications (e.g., Bluetooth, near-field communications, etc.). In some implementations, the consumer device may be placed in a location that is beneficial for users interacting with the consumer device but does not allow the M2M device to transmit the capture data to a server for processing the captured data. Systems and/or methods described herein may enable a mobile device, carried by a user interacting with the consumer device, to act as a gateway that receives the captured data from the M2M device and transmits the captured data to the server.

Figure 1A:
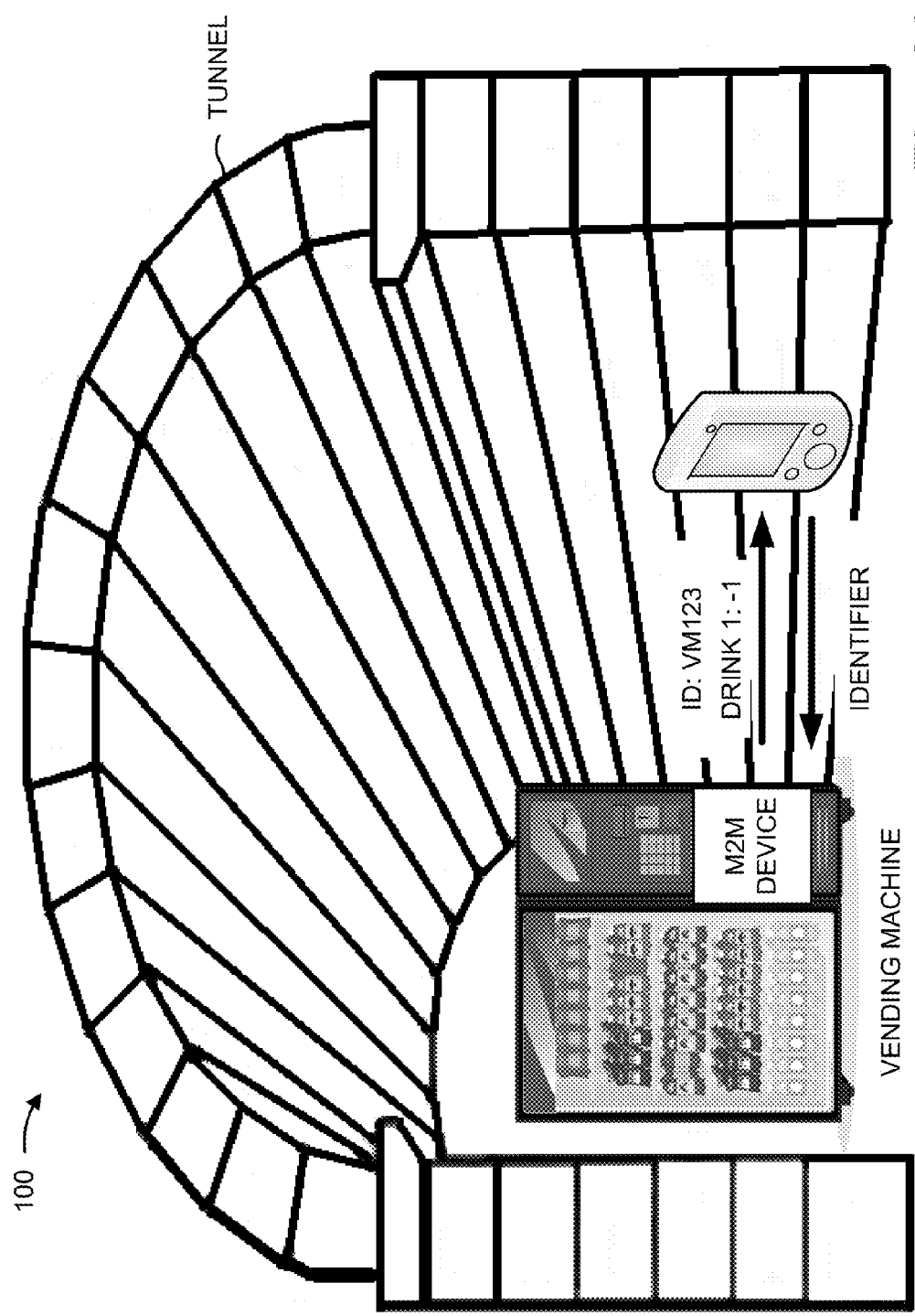
FIGS. 1A-1C are diagrams illustrating an overview of a mobile device M2M gateway system according to implementations described herein.
Figure 1B:
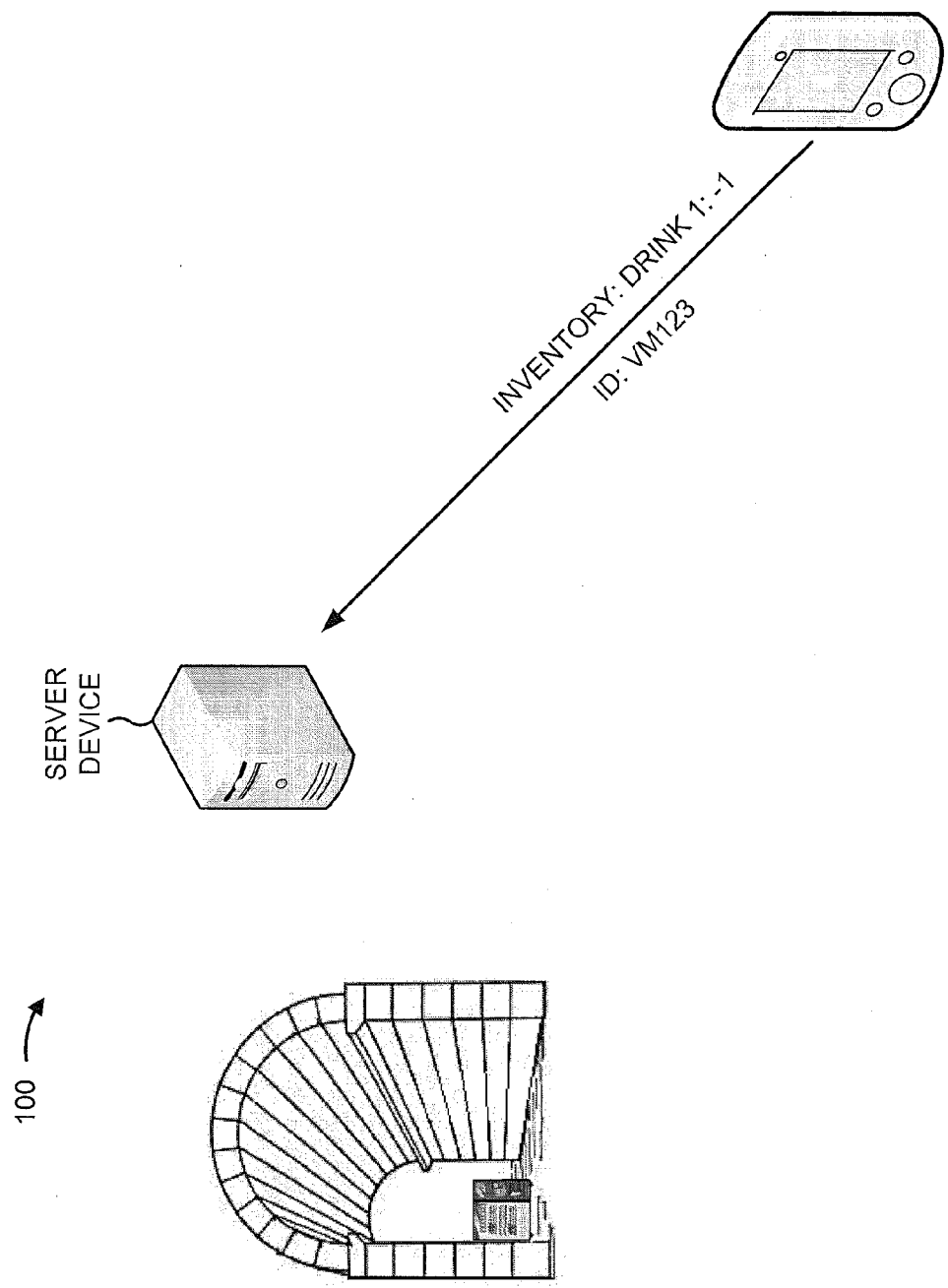
Figure 1C:
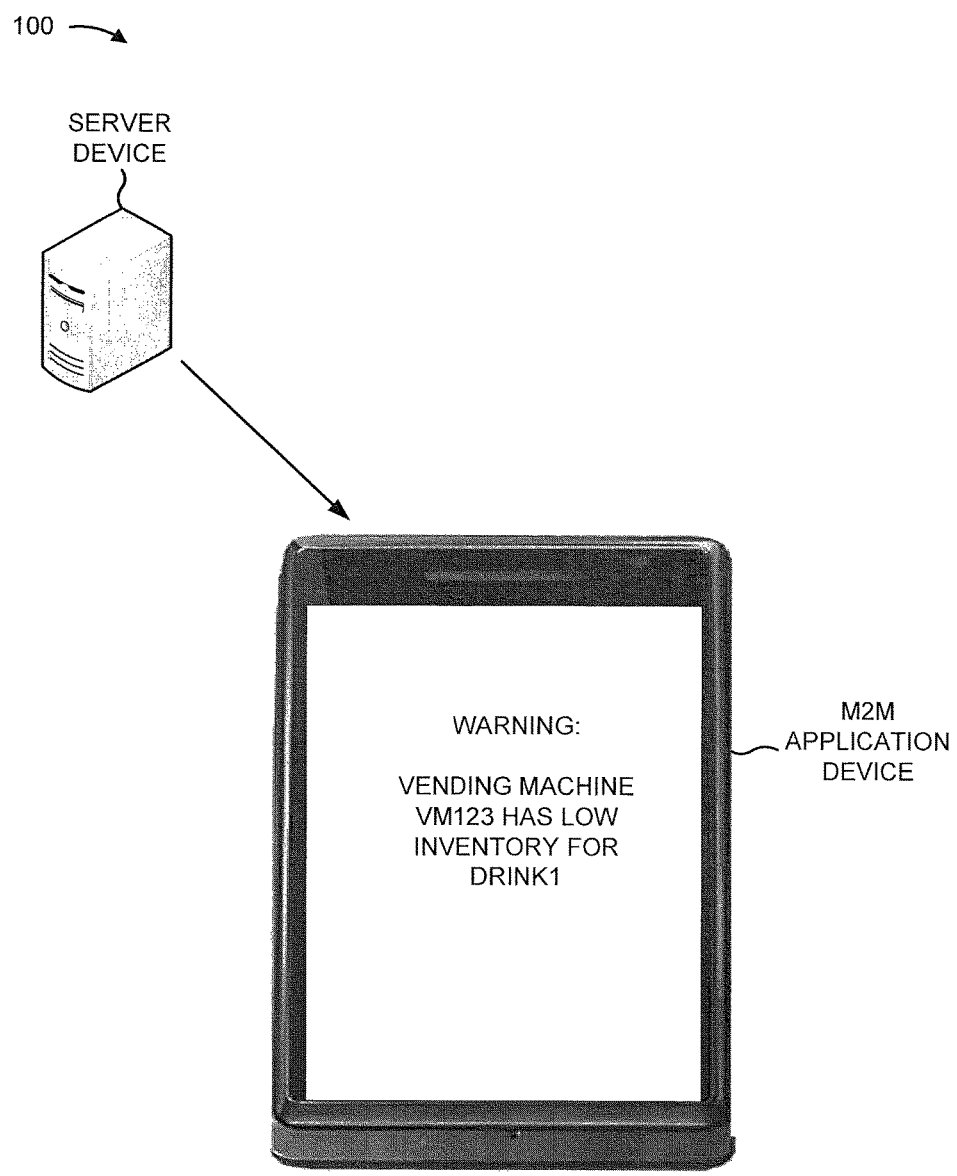

FIGS. 1A-1C provide diagrams illustrating an overview 100 of a mobile device M2M gateway system according to implementations described herein. For overview 100, assume that a vendor installs a vending machine in a tunnel of a subway system. Assume that the vending machine includes a M2M device for determining data related to changes in inventory of the vending machine. Assume that, from within the tunnel, the M2M device is unable to establish a network connection for transmitting the data related to the changes in the inventory. Assume that a person has purchased a drink ("DRINK 1") from the vending machine and that the person is carrying a smart phone that is able to act as a gateway for M2M devices.

Referring now to FIG. 1A, the vending machine may determine that the person has purchased the drink and may generate data indicating that the inventory for the purchased drink has changed. The M2M device may determine that the smart phone is radiating an identifier associated with an application that allows the smart phone to act as a gateway for the M2M device. Based on the identifier, the M2M device may establish a connection with the smart phone and may transmit information identifying the vending machine ("VM123") and the generated data ("INVENTORY: DRINK 1: −1"). The smart phone may receive the information identifying the vending machine and the generated data from the M2M device. Based on the information identifying the vending machine, the smart phone may determine that the data is to be transmitted to a particular server device. The smart phone may determine that it is currently unable to establish a network connection for transmitting the data to the server device and may store the data in a memory of the smart phone until the connection can be established.

Referring to FIG. 1B, upon exiting the tunnel, the smart phone may establish a network connection and may transmit the information identifying the vending machine and the generated data to the server via the network connection. Referring now to FIG. 1C, the server device may receive the information identifying the vending machine and the generated data and may determine that the vending machine has low inventory for Drink 1. The server device may identify a M2M application device associated with the vendor and may send a message to the M2M application device to notify the vendor that the inventory of Drink 1 in the vending machine is low.

Figure 2:
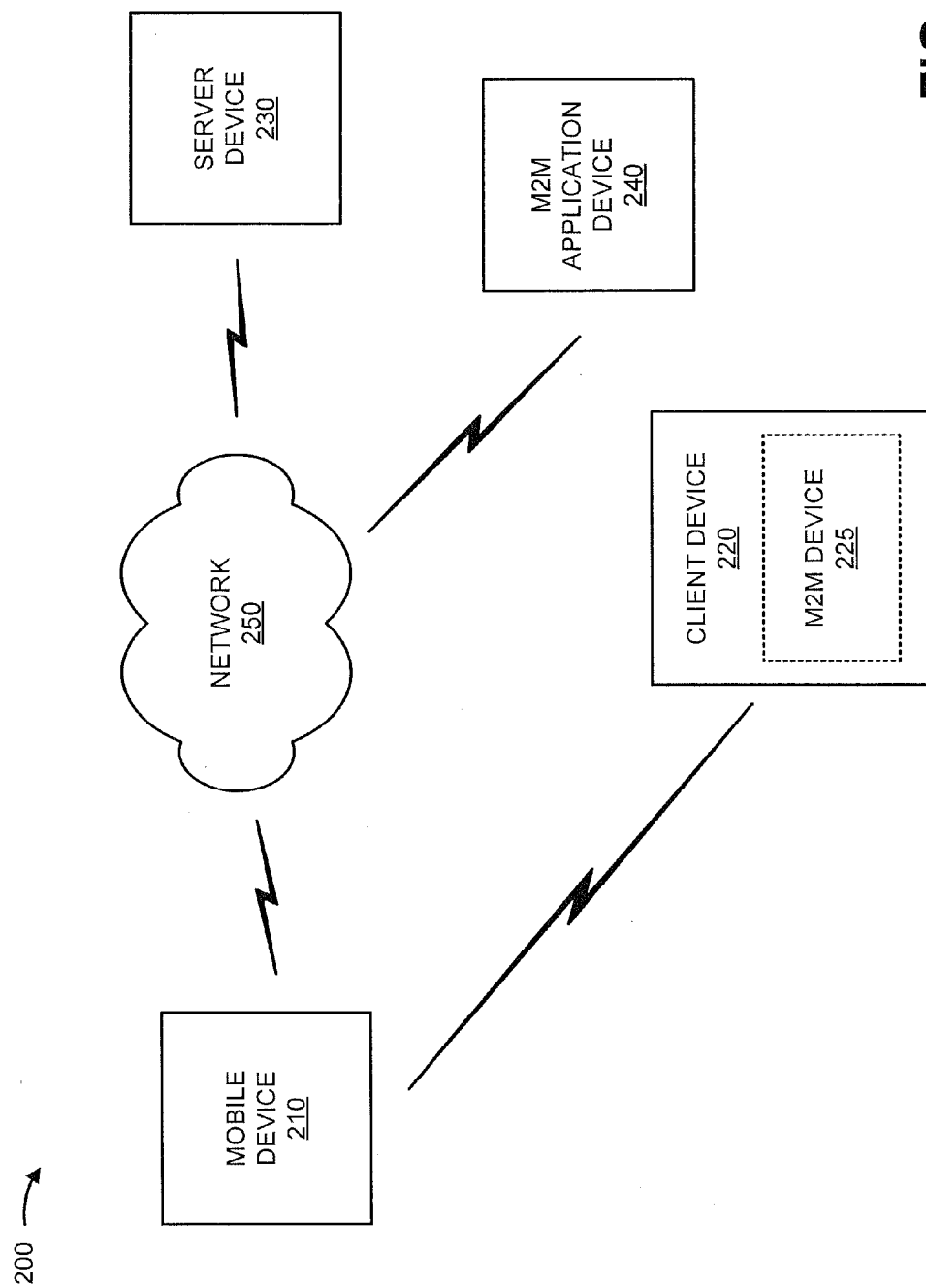
FIG. 2 is a diagram of an environment in which systems and/or methods, described herein, may be implemented.

FIG. 2 is a diagram of an environment 200 in which systems and/or methods described herein may be implemented. As shown in FIG. 2, environment 200 may include a mobile device 210, a client device 220, a server device 230, a M2M application device 240, and a network 250. Devices of environment 200 may interconnect via wired connections, wireless connections, or a combination of wired and wireless connections.

Mobile device 210 may include a device capable of receiving data from client device 220 and transmitting the received data to server device 230. For example, mobile device 210 may include a personal digital assistant (PDA) (e.g., that include a radio telephone, a pager, Internet/intranet access, etc.), a tablet computer, a smart phone, a laptop, a gaming device, and/or other types of devices capable of receiving data from client device 220 and transmitting the received data to server device 230.

Client device 220 may include a device capable of interacting with a user to perform a particular function. For example, client device 220 may include a vending machine, an automated teller machine (ATM), an exercise machine (e.g., a treadmill, an elliptical device, etc.), a printer, a copier, and/or other types of devices capable of interacting with a user to perform a particular function.

In some implementations, client device 220 may include M2M device 225. M2M device 225 may include a device that includes a sensor, a meter, and/or other types of devices for detecting a user interaction associated with a user interacting with client device 220 to cause client device 220 to perform a particular function and determining data related to the user interaction. M2M device 225 may further include a device that is capable of detecting a presence of mobile device 210 and transmitting the determined data to mobile device 210 via a near-field network that employs one or more wireless communication protocols, such as, for example, near field communication (NFC), IEEE 802.15 (e.g., Bluetooth), and/or IEEE 802.11 (e.g., Wi-Fi).

Server device 230 may include one or server devices that receive, via network 250, data generated by M2M device 225 from mobile device 210. Server device 230 may process the data to determine an occurrence of an event associated with client device 220. In response to the occurrence of the event, server device 230 may perform a particular action (e.g., send information related to the event to M2M application device 240).

M2M application device 240 may include a device capable of receiving information related to an occurrence of an event associated with client device 220 from server device 230 and/or providing information related to an occurrence of an event associated with client device 220 to a user. Examples of M2M application device 240 may include a laptop, a tablet computer, a personal computer, a set top box, and/or other types of devices capable of receiving information related to an occurrence of an event associated with client device 220 from server device 230 and/or providing information related to an occurrence of an event associated with client device 220 to a user.

Network 250 may include any type of network, such as, for example, a local area network ("LAN"), a wide area network ("WAN"), a telephone network, such as the Public Switched Telephone Network ("PSTN") or a cellular network, an intranet, the Internet, or a combination of these or other types of networks. In some implementations, network 240 may include a local wireless network, such as a home wireless network. Mobile device 210, server device 230, and/or M2M application device 240 may connect to network 250 via wired connections, wireless connections, or a combination of wired and wireless connections.

Although FIG. 2 shows example components of environment 200, in some implementations, environment 200 may include fewer components, different components, differently arranged components, or additional components than those depicted in FIG. 2. In some implementations, one or more components of environment 200 may perform one or more tasks described as being performed by one or more other components of environment 200.

FIG. 3 illustrates example components of a device 300 that may be used within environment 200. Device 300 may correspond to mobile device 210, client device 220, M2M device 225, server device 230, and/or M2M application device 240. In some implementations, mobile device 210, client device 220, M2M device 225, server device 230, and/or M2M application device 240 may include one or more devices 300 and/or one or more components of device 300.

As shown in FIG. 3, device 300 may include bus 310, processor 320, memory 330, input device 340, output device 350, and communication interface 360. Bus 310 may include a path that permits communication among the components of device 300. Processor 320 may include a processor, a microprocessor, an application specific integrated circuit (ASIC), a field programmable gate array (FPGA), or another type of processor that interprets and executes instructions.

Memory 330 may include a random access memory (RAM) or another type of dynamic storage device that stores information or instructions for execution by processor 320, a read-only memory (ROM) or another type of static storage device that stores static information or instructions for processor 320, and/or a magnetic storage medium, such as a hard disk drive, or a removable memory, such as a flash memory.

Input device 340 may include a mechanism that permits an operator to input information to device 300, such as a control button, a keyboard, a keypad, a touch screen interface, a microphone, a camera, a video recorder, or another type of input device. Output device 350 may include a mechanism that outputs information to the operator, such as a light emitting diode (LED), a display, a speaker, or another type of output device. Communication interface 360 may include any transceiver-like mechanism that enables device 300 to communicate with other devices or networks. In one implementation, communication interface 360 may include a wireless interface, a wired interface, or a combination of a wireless interface and a wired interface.

Device 300 may perform certain operations, as described in detail below. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices.

The software instructions may be read into memory 330 from another computer-readable medium or from another device via communication interface 360. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. In some implementations, one or more components of device 300 may perform one or more tasks described as being performed by one or more other components of device 300.

FIG. 4 is a diagram of an example data structure 400 for storing M2M device data. In some implementations, data structure 400 may be stored by server device 230. In some implementations, data structure 400 may be stored by another device that is accessible by server device 230. In some implementations, one or more portions of data structure 400 may be stored by mobile device 210, client device 220, and/or M2M device 225. In some implementations, data structure 400 may be created based on the processing described in connection with FIGS. 5 and 7.

As shown in FIG. 4, data structure 400 may include a device identifier (ID) field 405, a device type field 410, a customer ID field 415, a data type field 420, and a data field 425. In some implementations, data structure 400 may be associated with a particular mobile device 210, client device 220, M2M device 225, and/or M2M application device 240. For example, server device 230 may store a separate data structure 400 for each mobile device 210, client device 220, M2M device 225, and/or M2M application device 240 associated with server device 230.

Device ID field 405 may store a device identifier and/or other information identifying a mobile device, a client device, a M2M device, and/or a user device. For example, device ID field 405 may store a unique sequence of characters, a network address, and/or other information that can be used to uniquely identify a mobile device, a client device, a M2M device, and/or a user device within a system.

Device type field 410 may store information identifying a type of a device. The type of the device may indicate whether the device is a mobile device, a client device, a M2M device, and/or a user device. For example, as shown in FIG. 4, device type field 410 indicates that device ID VM123 is a vending machine.

Customer ID field 415 may store information that identifies a user associated with a mobile device, a client device, a M2M device, and/or a user device. For example, customer ID field 415 may store a username, information identifying a business or other type of legal entity, and/or other information that identifies a user associated with a mobile device, a client device, a M2M device, and/or a user device.

Data type field 420 may store information identifying a type of data stored in data field 425. For example, as shown in FIG. 4, data type field 420 may store information identifying a type of data stored in data field 425 as inventory data (e.g., data associated with a change in inventory of client device 220), fitness data (e.g., data associated with a user performing an exercise using client device 220), and/or incentive data (e.g., data associated with a rewards program that provides incentives to users based on an amount of data transmitted via mobile device 210).

Data field 425 may store data related to an occurrence of a user interaction detected by M2M device 225. In some implementations, the data related to the occurrence of the user interaction may be defined based on the data type. For example, data field 425 may store different data depending on whether the type of data is inventory data, fitness data, or incentive data. As shown in FIG. 4, for inventory data, data field 425 may store, for example, product IDs identifying items stocked in vending machine VM123, a current quantity of each item, and information indicating at what quantity Customer1 is to be sent an email notifying the customer that a quantity of the item is low.

Although FIG. 4 shows example fields of data structure 400, in some implementations, data structure 400 may include additional fields, different fields, or fewer fields than those depicted in FIG. 4.

FIG. 5 is a flow chart of an example process 500 for configuring M2M device 225. In some implementations, process 500 may be performed by M2M application device 240. In some implementations, one or more blocks of process 500 may be performed by one or more devices instead of, or possibly in conjunction with, M2M application device 240.

As shown in FIG. 5, process 500 may include transmitting a request for a M2M gateway application for configuring M2M device 225 (block 510). For example, a user may purchase a treadmill (e.g., client device 220) that includes M2M device 225. The user may desire to configure M2M device 225 using a home computer (e.g., M2M application device 240) and may cause the home computer to transmit a request for a M2M gateway application that may enable the user to configure M2M device 225.

In some implementations, a user may cause M2M application device 240 to obtain information regarding applications that may be purchased by the user. For example, the user may cause M2M application device 240 to access an application store, which provides information regarding applications (including the M2M gateway application) that may be purchased. In some implementations, the user may cause M2M application device 240 to access the application store via, for example, a user interface (such as a browser) or in another manner. The user may then select, using M2M application device 240, information regarding the M2M gateway application from the information regarding the applications to cause M2M application device 240 to transmit a request for the gateway application.

Process 500 may include receiving a M2M gateway application (block 520). For example, in response to transmitting the request, M2M application device 240 may receive a M2M gateway application and may store the M2M gateway application in a memory associated with M2M application device 240 (e.g., memory 330). In some implementations, a user, of M2M application device 240, may establish an account with a service provider associated with M2M device 225 and/or the M2M gateway application prior to (e.g., when purchasing M2M device 225 and/or a device that includes M2M device 225), or after, receiving the M2M gateway application.

Process 500 may include initiating a configuration of M2M device 225 using the M2M gateway application (block 530). For example, a user may initiate the M2M gateway application and identify, using M2M application device 240, one or more preferences relating to using mobile device 210 as a gateway for M2M device 225. In some implementations, the user may identify the one or more preferences using one or more elements of a user interface provided by M2M application device 240. The one or more elements may include, for example, one or more text input elements, one or more drop down menu elements, one or more checkbox elements, one or more radio button elements, and/or any other types of elements that may be used to receive information from the user.

In some implementations, the one or more preferences may include a preference of the user with respect to a type of data obtained and/or transmitted by M2M device 225. For example, M2M device 225 may be included on a device that a user interacts with to perform a particular function. The user may provide information indicating that M2M device 225 obtains data related to the device performing the particular function.

In some implementations, particular function may be obtaining a product and/or other type of item. For example, M2M device 225 may be included on a vending machine. The user may provide information indicating that M2M device 225 obtains and/or transmits inventory information. The inventory information may include information identifying a particular product that has been purchased, information identifying a quantity of products sold, information identifying a quantity of a particular product remaining, information indicating an amount of money that has been deposited into the vending machine, information related to an amount of money and/or denominations of money (e.g. a quantity of quarters, a quantity of nickels, etc.) available for providing change when a user deposits an amount greater than the purchase price of a product, and/or other information related to a user interacting with the vending machine.

In some implementations, the particular function may include interacting with a device to perform an exercise. For example, M2M device 225 may be included on an exercise device (e.g., a treadmill, an elliptical machine, etc.). The user may provide information indicating that M2M device 225 obtains and/or transmits fitness data. The fitness data may include information indicating an amount of time a user spent exercising, information related to a heart rate of the user before, during, and/or after exercising, and/or other types of information that may be related to a user interacting with the exercise machine.

In some implementations, the one or more preferences may include a preference of the user with respect to a type of network for transmitting data to mobile device 210. For example, the user may provide information indicating that M2M device 225 is only to transmit data to mobile device 210 using near field communications, Bluetooth, RFID, WiFi, etc.

In some implementations, the one or more preferences may include a preference of the user with respect to an occurrence of an event. For example, the user may provide information identifying an event. The event may occur when a quantity of one or more products is a minimum quantity, when data is received by server device 230, when mobile device 210 transmits data to server device 230, and/or other types of events related to a user interacting with client device 220.

In some implementations, the one or more preferences may include a preference of the user with respect to an action to be taken in response to an occurrence of an event. For example, the user may identify an action to be performed by server device 230 when an occurrence of an event is detected. The action may include providing particular information to M2M application device 240, providing particular information to M2M application device 240 via an email, a text message, etc., and/or other types of actions that may be taken by server device 230 in response to determining an occurrence of an event.

In some implementations, the one or more preferences may include a preference of the user with respect to an incentive offered to users of mobile devices 210 acting as a gateway for M2M device 225. For example, the user may provide information indicating that certain discounts and/or other incentives are to be provided to users of M2M devices 225 that act as a gateway for M2M device 225. As an example, assume that client device 220 is a vending machine that sells a particular candy bar. A user may provide information indicating that an M2M device 225, included on the vending machine, is to cause the vending machine to reduce the price of the particular candy bar when M2M device 225 detects that a person interacting with the vending machine to purchase the particular candy bar, is carrying a mobile device 210 that is available to act as a gateway for M2M device 225.

In some implementations, the one or more preferences may include a preference with respect to whether mobile device 210 is to be charged a fee associated with transmitting data to server device 230. For example, the user may provide information indicating that a fee, or a portion of a fee, associated with mobile device 210 transmitting data to server device 230 is to be billed to an account associated with the user.

In some implementations, a type of the account, of the user, associated with the M2M gateway application may determine preferences that the user is able to identify. For example, the M2M gateway application may enable the user to identify only a particular group of the above preferences and/or identify additional preferences based on the type of the account with which the user is associated. For example, the M2M gateway application may allow users having accounts associated with a premium level service to identify multiple events and/or multiple actions to be taken by server device 230 upon an occurrence of one or more of the multiple events while users having accounts associated with a non-premium level service may only be allowed to identify a single event and/or a single action to be taken by server device 230 upon an occurrence of the event.

In some implementations, the M2M gateway application may analyze information relating to M2M device 225 and/or a user, of M2M application device 240, to determine the one or more preferences of the user relating to using mobile device 210 as a gateway for M2M device 225. For example, the information relating to M2M application device 240 may include information regarding a type of connection that M2M device 225 is capable of establishing with mobile device 210.

In some implementations, the user may provide registration information, associated with M2M device 225, to initiate the configuration of M2M device 225. The registration information may include information for enabling server device 230 to provide, to user device 210, server configuration information that enables user device 210 to act as the gateway device for M2M device 225. For example, a vendor may register with a particular service provider and/or a service for enabling user device 210 to act as a gateway device for M2M device 225. The registration information may include information identifying the particular service provider and/or the service (e.g., a username and/or password, account information, information identifying M2M device 225, information identifying the service, information identifying the particular service provider, etc.) and/or other information that allows server device 230 to determine that M2M device 225 is authorized to have user device 210 act as a gateway device for M2M device 225.

Process 500 may include transmitting M2M device information to a server device (block 540). In some implementations, the user may cause M2M application device 240 to transmit, to server device 230, information identifying the one or more preferences and/or registration information associated with M2M device 225. Server device 230 may receive the information identifying the one or more preferences and/or the registration information and may store the information identifying the one or more preferences and/or the registration information in a profile associated with M2M device 225. For example, the information identifying the one or more preferences may include an identifier and/or other information identifying the user, M2M application device 240, and/or M2M device 225. Server device 230 may identify a profile associated with the user, M2M application device 240, and/or M2M device 225 based on the identifier and/or other information identifying the user, M2M application device 240, and/or M2M device 225. Server device 230 may store the information identifying the one or more preferences and/or the registration information in the profile. In some implementations, server device 230 may store the information identifying the one or more preferences and/or the registration information in a data structure, such as data structure 400.

In some implementations, server device 230 may determine server information associated with user device 210 acting as a gateway device for M2M device 225. For example, server device 230 may perform data mediation for a group of service providers associated with multiple, different M2M devices 225. The registration information may include information identifying a particular service provider, of the group of service providers, associated with M2M device 225. In some implementations, server device 230 may determine information for identifying data, received from user device 210, as being associated with the particular service provider. For example, server device 230 may determine an identifier associated with the particular service provider. Server device 230 may identify received data as being associated with the particular service device based on the identifier.

In some implementations, server device 230 may determine information for enabling user device 210 to transmit data, received from M2M device 225 to a server device associated with M2M device 225. In some implementations, the information may include a network address for the server device. For example, upon receiving a request, from user device 210, to act as a gateway device for M2M device 225, server device 230 may send a message that notifies user device 210 that M2M device 225 is a trusted device (e.g., that user device 210 can act as a gateway device for M2M device 225) and/or information identifying the network address for the server device to enable user device 210 to send data, received from M2M device 225, to the server device.

Process 500 may include receiving M2M configuration information (block 550). For example, in response to transmitting the M2M device information to server device 230, M2M application device 240 may receive configuration information from server device 230. The configuration information may include information for enabling server device 230 to authenticate M2M device 225 to user device 210 and/or to identify data, received from user device 210, as being associated with M2M device 225, the user, and/or a service provider associated with M2M device 225. M2M device 225 may include all, or a portion of, the configuration information in a request to pair and/or data transmitted to user device 210. M2M application device 240 may transmit, via a short-field network, the configuration information, the registration information, and/or all, or a portion of, the preferences to M2M device 225. M2M device 225 may receive the information identifying all or a portion of the preferences.

Process 500 may include storing configuration information and preferences and configuring M2M device 225 (block 560). For example, M2M device 225 may receive the configuration information and information identifying all, or a portion of, the preferences and may store the information in a memory associated with M2M device 225. M2M device 225 may be configured based on storing the configuration information and/or all, or a portion of, the preferences. In some implementations, the user may configure M2M device 225 by adjusting parameters associated with one or more components of M2M device 225. For example, the user may adjust a transceiver of M2M device 225 to enable M2M device 225 to detect and/or establish a connection with a mobile device transmitting a particular identifier.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

FIG. 6 is a diagram illustrating an example user interface 600 that may be used in connection with process 500 described in connection with FIG. 5. For example, user interface 600 may be provided by M2M application device 240 to a user, of M2M application device 240, to enable the user to identify information (e.g., preferences) that may be used to configure a M2M gateway application.

As shown in relation to FIG. 6, user interface 600 may allow the user to provide a username or other information associated with the user, M2M application device 240, and/or M2M device 225. For example, the user may provide information identifying the user, information identifying an account of the user, information identifying M2M application device 240, and/or information identifying M2M device 240

User interface 600 may allow the user to identify a type of data that is to be transmitted. User interface 600 may allow the user to select between multiple types of data. Selection of a particular type of data may cause user interface 600 to provide particular set of elements (e.g., text input elements, radio button elements, and/or any other types of elements that may be used to receive information from the user) related to the selected type of data. For example 600, assume that the user has selected fitness as the data type. As shown in FIG. 6, user interface 600 provides elements for identifying the fitness data that is to be transmitted to server device 230, whether the fitness data is to be displayed prior to being transmitted to server device 230, and whether a copy of the fitness data is to be stored locally.

Once a user has identified the preferences, user interface 600 may allow the user to select a "SUBMIT" option to store the preferences and/or transmit the preferences to M2M device 225 and/or server device 230.

As shown in relation to FIG. 6, user interface 600 may also allow the user to select a "BACK" option to cause M2M application device 240 to provide information regarding the M2M gateway application. As shown in relation to FIG. 6, user interface 600 may also allow the user to select a "MORE CONFIGURATION" option to enable the user to identify additional information that may be used to configure the M2M gateway application. For example, if the user desires to provide information regarding additional exercise equipment, the user may select the MORE CONFIGURATION option to provide preferences for the additional exercise equipment.

The number of elements of user interface 600 shown in FIG. 6 is provided for explanatory purposes. In practice, user interface 600 may include additional elements, fewer elements, different elements, or differently arranged elements than those shown in FIG. 6. As indicated above, FIG. 6 is provided merely as an example. Other examples are possible and may differ from what was described with regard to FIG. 6.

Figure 7:
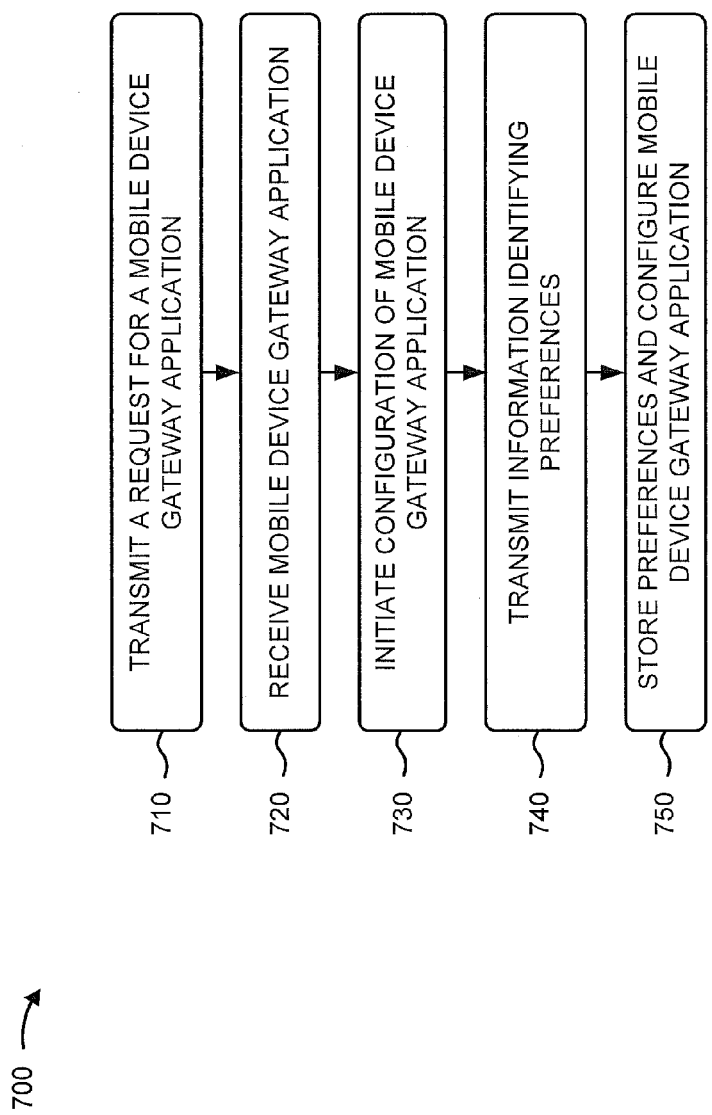
FIG. 7 is a flow chart of an example process for configuring a mobile device gateway application.

FIG. 7 is a flow chart of an example process 700 for configuring a mobile device gateway application. In some implementations, process 700 may be performed by mobile device 210 and/or M2M application device 240. In some implementations, one or more blocks of process 700 may be performed by one or more devices instead of, or possibly in conjunction with, mobile device 210 and/or M2M application device 240.

As shown in FIG. 7, process 700 may begin with transmitting a request for a mobile device gateway application (block 710). For example, mobile device 210 may transmit a request for a mobile device gateway application that may enable mobile device 210 to act as a gateway for M2M device 225. In some implementations, a user may cause mobile device 210 to obtain information regarding applications that may be purchased by the user. For example, the user may cause mobile device 210 to access an application store, which provides information regarding applications (including the mobile device gateway application) that may be purchased. In some implementations, the user may cause mobile device 210 to access the application store via, for example, a user interface (such as a browser) or in another manner. The user may then select, using mobile device 210, information regarding the mobile device gateway application from the information regarding the applications to cause mobile device 210 to transmit a request for the mobile device gateway application.

Process 700 may include receiving a mobile device gateway application (block 720). For example, in response to transmitting the request, mobile device 210 may receive a mobile device gateway application and may store the mobile device gateway application in a memory associated with mobile device 210 (e.g., memory 330). In some implementations, a user, of mobile device 210, may establish an account with a service provider associated with the mobile device gateway application prior to, or after, receiving the mobile device gateway application.

Process 700 may include initiating a configuration of the mobile device gateway application (block 730). For example, a user may initiate the mobile device gateway application and identify, using mobile device 210, one or more preferences relating to mobile device 210 acting as a gateway for M2M device 225. In some implementations, the user may identify the one or more preferences using one or more elements of a user interface provided by mobile device 210. The one or more elements may include, for example, one or more text input elements, one or more drop down menu elements, one or more checkbox elements, one or more radio button elements, and/or any other types of elements that may be used to receive information from the user.

In some implementations, the one or more preferences may include a preference of the user with respect to particular M2M devices 225 for which mobile device 210 is to send data. For example, the user may provide information indicating that mobile device 210 is to send data for all M2M devices 225 that transmit data to mobile device 210, for M2M devices 225 that are included in client devices 220 owned and/or frequently used by the user, and/or M2M devices 225 that provide a reward, discount, and/or other types of incentives.

In some implementations, the one or more preferences may include a preference of the user with respect to when to send data received from M2M device 225. For example, the user may provide information indicating that data received from M2M device 225 should be sent over a home WiFi network, during a particular time period (e.g., between 10 pm and 5 am, nights, weekends, etc.), after a particular period of inactivity, and/or other information indicating when mobile device 210 is to transmit data received from M2M device 225.

In some implementations, a type of the account, of the user, associated with the mobile device gateway application may determine preferences that the user is able to identify. For example, the mobile device gateway application may enable the user to identify only a particular group of the above preferences and/or identify additional preferences based on the type of the account with which the user is associated.

In some implementations, the mobile device gateway application may analyze information relating to mobile device 210 and/or a user, of mobile device 210, to determine the one or more preferences of the user relating to acting as a gateway for M2M device 225. For example, the information relating to mobile device 210 may include information regarding types of networks to which mobile device 210 is able to connect. When mobile device 210 is connected to one type of network (e.g., a cellular network), the mobile device gateway application may cause mobile device 210 to delay sending data to server device 230 until mobile device 210 is connected to another type of network (e.g., a WiFi network).

Process 700 may include transmitting information identifying preferences (block 740). In some implementations, the user may cause mobile device 210 to transmit, to server device 230, information identifying the one or more preferences relating to the user. Server device 230 may receive the information identifying the one or more preferences and store the information identifying the one or more preferences in a user profile associated with the user and/or a data structure (e.g., data structure 400). For example, the information identifying the one or more preferences may include an identifier and/or other information identifying the user and/or mobile device 210. Server device 230 may identify a user profile associated with the user and/or mobile device 210 based on the identifier and/or other information identifying the user and/or mobile device 210. Server device 2320 may store the information identifying the one or more preferences in the user profile.

In some implementations, the user profile and/or the information identifying the one or more preferences may include information identifying one or more other mobile devices 210 associated with the user. Server device 230 may send information identifying the one or more preferences to the one or more other mobile devices 210 associated with the user. For example, the user may download and install the mobile device gateway application on multiple mobile devices 210. The user may configure the mobile device gateway application on one of the multiple mobile devices 210 and may transmit the information identifying the preferences to server device 230. Server device 230 may send information identifying the one or more preferences to other ones of the multiple mobile devices 210 to configure the mobile device gateway application installed on the other ones of the multiple mobile devices 210.

Process 700 may include storing preferences and configuring the mobile device gateway application (block 750). For example, a user, of mobile device 210, may cause mobile device 210 to store all or a portion of the preferences. The mobile device gateway application may be configured based on storing all or a portion of the preferences. In some implementations, the user may configure the mobile device gateway application by adjusting parameters associated with one or more components of mobile device 210. For example, the user may adjust one or more settings for transmitting data over a cellular network, one or more settings for transmitting data over a local area network, such as a hotspot or WiFi network, etc.

While FIG. 7 shows process 700 as including a particular quantity and arrangement of blocks, in some implementations, process 700 may include fewer blocks, additional blocks, or a different arrangement of blocks. Additionally, or alternatively, some of the blocks may be performed in parallel.

Figure 8:
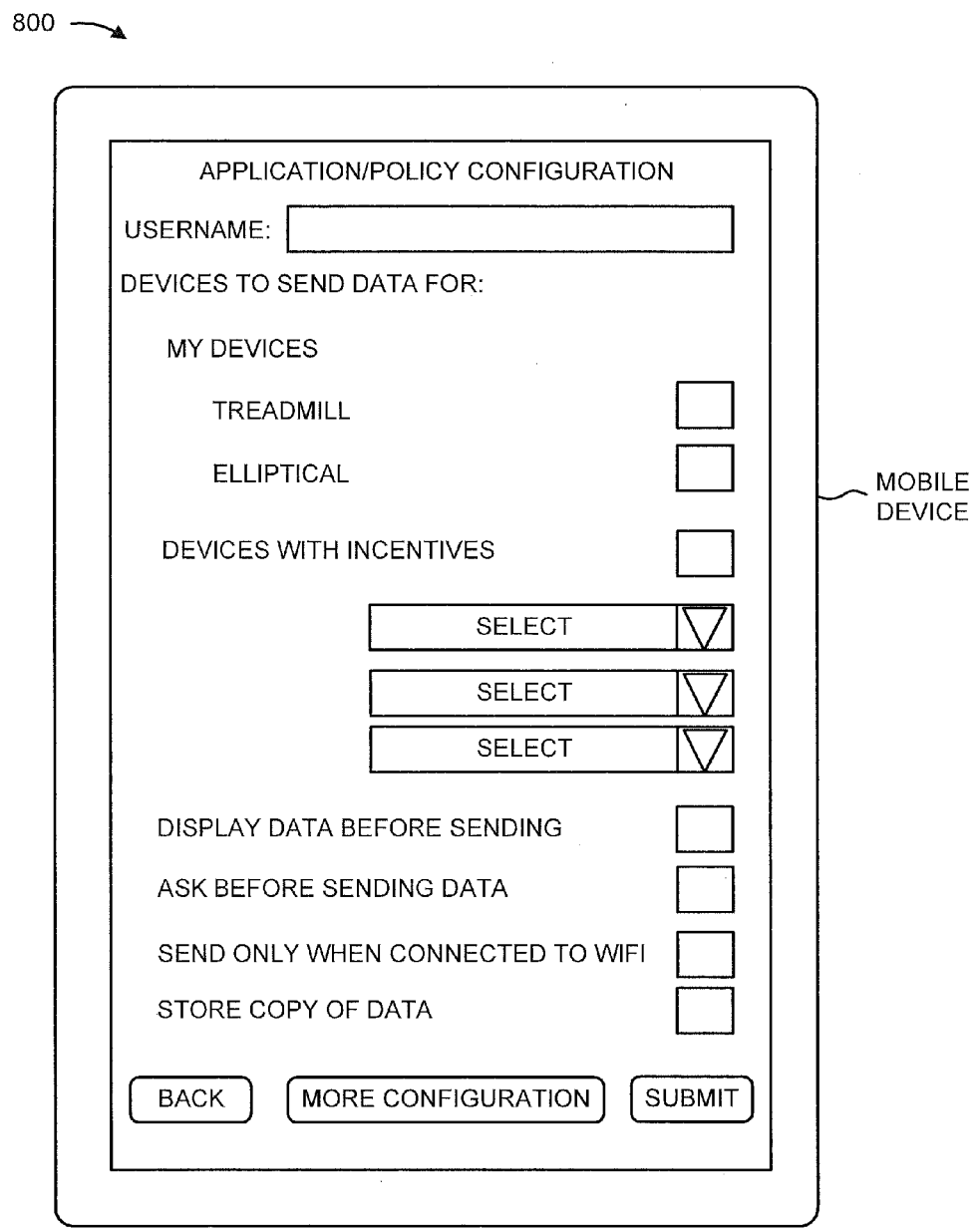
FIG. 8 is a diagram illustrating an example user interface that may be used in connection with the process described in connection with FIG. 7.

FIG. 8 is a diagram illustrating an example user interface 800 that may be used in connection with process 700 described in connection with FIG. 7. For example, user interface 800 may be provided by mobile device 210 to a user, of mobile device 210, to enable the user to identify information (e.g., preferences) that may be used to configure a mobile device gateway application and enable mobile device 210 to act as a gateway for M2M device 225.

As shown in relation to FIG. 8, user interface 800 may allow the user to provide a username or other information for identifying the user and/or mobile device 210. For example, the user may provide a user name associated with the user and/or information identifying mobile device 210.

User interface 800 may allow the user to identify particular M2M devices 225 for which mobile device 210 is to transmit data. For example, the user may provide information indicating that mobile device 210 is to transmit data for M2M devices 225 included on client devices 220 owned and/or frequently used by the user, and/or M2M devices 225 that offer particular incentives or rewards for transmitting data received from particular M2M devices 225.

User interface 800 may allow the user to indicate whether mobile device 210 is to display data received from M2M device 225 and/or provide the user with a notification prior to transmitting the data to server device 230. For example, in response to receiving data from M2M device 225, mobile device 210 may provide a notification via a display of mobile device 210. The notification may include the received data and/or information indicating that mobile device 210 has received data from M2M device 225. The notification may also include one or more buttons that the user can select to indicate whether mobile device 210 is to transmit the data to server device 230 and/or store a copy of the data in a memory of mobile device 210.

User interface 800 may allow the user to indicate whether mobile device 210 is to transmit data received from M2M device 225 via a cellular network. For example, user interface 800 may allow the user to provide information indicating that mobile device 210 is only to transmit data received from M2M device 225 via a WiFi network.

Once a user has identified the preferences, user interface 800 may allow the user to select a "SUBMIT" option to store the preferences (e.g., when mobile device 210 is used to configure the mobile device gateway application) and/or send the preferences to mobile device 210 and/or server device 230 (e.g., when the mobile device gateway application is configured using a device other than mobile device 210 (e.g., M2M application device 240)).

As shown in relation to FIG. 8, user interface 800 may also allow the user to select a "BACK" option to cause mobile device 210 to provide information regarding the gateway application. As shown in relation to FIG. 8, user interface 800 may also allow the user to select a "MORE CONFIGURATION" option to enable the user to identify additional information that may be used to configure the gateway application. For example, if the user desires to configure the gateway application to enable mobile device 210 to act as a gateway for M2M devices 225 located in a particular geographic area, the user may select OTHER DEVICES and then select the MORE CONFIGURATION option. In response to the user selecting OTHER DEVICES and the MORE CONFIGURATION option, user interface 800 may provide a list of M2M devices 225 located in a geographic area around a current location of mobile device 210 and may allow the user to select one or more of the listed M2M devices 225.

The number of elements of user interface 800 shown in FIG. 8 is provided for explanatory purposes. In practice, user interface 800 may include additional elements, fewer elements, different elements, or differently arranged elements than those shown in FIG. 8. As indicated above, FIG. 8 is provided merely as an example. Other examples are possible and may differ from what was described with regard to FIG. 8.

Figure 9B:
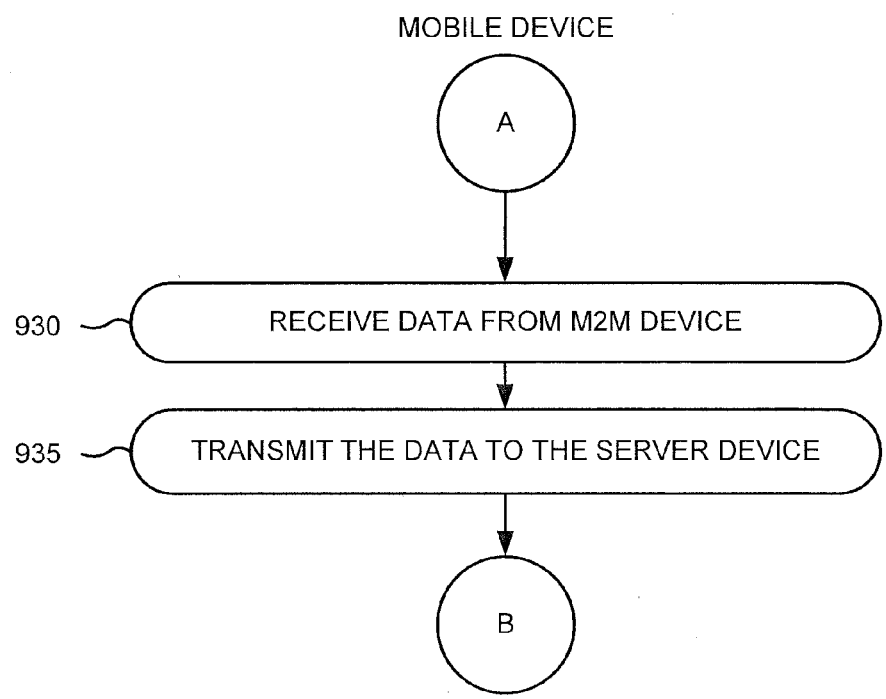
Figure 9C:
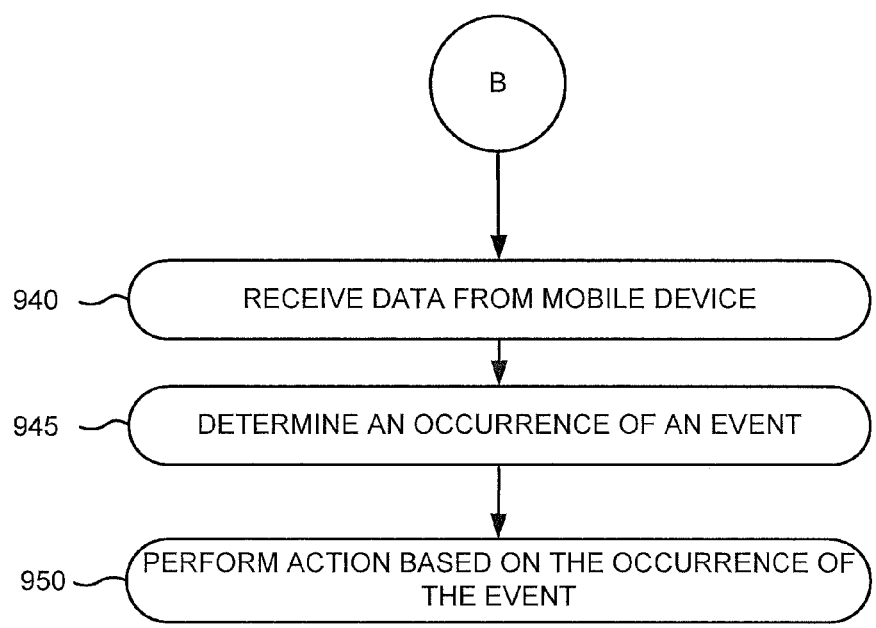

FIGS. 9A-9C are a flow chart of an example process 900 for transmitting data within a mobile device M2M gateway system. In some implementations, process 900 may be performed by mobile device 210, M2M device 225, and/or server device 230. In some implementations, one or more blocks of process 900 may be performed by one or more devices instead of, or possibly in conjunction with, mobile device 210, M2M device 225, and/or server device 230.

Process 900 may include determining an occurrence of a user interaction (block 905, FIG. 9A). For example, M2M device 225 may detect that a user is interacting with client device 220 to cause client device 220 to perform a particular function. For example, client device 220 may correspond to a vending machine that dispenses coffee. M2M device 225 may detect that a user has inserted money into the vending machine to purchase a cup of coffee.

Process 900 may include obtaining data related to the user interaction (block 910). For example, M2M device 225 may obtain data related to the user interacting with client device 220. In some implementations, M2M device 225 may determine information associated with when the user interaction occurred. For example, M2M device 225 may determine a time and/or a date associated with the user interacting with client device 220.

In some implementations, M2M device 225 may determine inventory data relating to the user interaction. For example, a user may interact with client device 210 to purchase a product. M2M device 225 may determine information relating to a change in an inventory of client device 220, an amount of money deposited by the user to purchase the product, denominations of money deposited by the user, an amount of money provided as change to the user by client device 220, denominations of money provided as change to the user by client device 220, a quantity and/or types of products purchased by the user, and/or other types of information relating to an inventory of client device 220.

In some implementations, M2M device 225 may determine fitness data related to the user interaction. For example, a user may interact with client device 240 to perform an exercise. M2M device 225 may determine a length of time that the user performed the exercise, information relating to a heart beat or pulse of the user before, during, and/or after performing the exercise, a speed at which the user performed the exercise, and/or other types of information related to using client device 220 to perform an exercise.

Process 900 may include detecting a mobile device (block 915). For example, mobile device 210 may periodically transmit a particular identifier. M2M device 225 may detect mobile device 210 based on mobile device 210 transmitting the particular identifier. M2M device 225 may detect mobile device 210 prior to, during, and/or after the occurrence of the user interaction.

In some implementations, M2M device 225 may modify one or more characteristics of client device 220 based on detecting mobile device 210. For example, a user may interact with client device 220 to purchase a product. Prior to the user purchasing the product, M2M device 225 may determine that the user is carrying a mobile device 210 that is capable of acting as a gateway for M2M device 225. In some implementations, mobile device 210 may radiate an identifier associated with a mobile device gateway application. M2M device 225 may determine a signal strength associated with receiving the identifier from mobile device 210. M2M device 220 may determine a distance of mobile device 210 from M2M device 225 based on the determined signal strength. M2M device 225 may determine that the user is carrying a mobile device 210 that is capable of acting as a gateway for M2M device 225 based on the determined distance. In response to determining that the user is carrying the mobile device 210 that is capable of acting as the gateway for M2M device 225, M2M device 225 may cause a price of the product being purchased by the user to be modified (e.g., reduced).

Process 900 may include establishing a connection with the mobile device (block 920). For example, M2M device

225 may establish a connection with mobile device 210 based on mobile device 210 transmitting the particular identifier. In some implementations, M2M device 225 may determine that the particular identifier is associated with a mobile device gateway application that may enable mobile device 210 to receive data from M2M device 225 and transmit the received data to server device 230. M2M device 225 may establish the connection with mobile device 210 based on the particular identifier being associated with the mobile device gateway application.

For example, M2M device 225 may send a request to establish a connection to mobile device 210 based on mobile device 210 transmitting the particular identifier. Mobile device 210 may receive the request and may forward the request to server device 230. Server device 230 may receive the request and may determine whether mobile device 210 should establish the connection with M2M device 225. For example, server device 230 may determine a vendor associated with M2M device 225. Server device 230 may is to establish the connection with M2M device 225 based on M2M device 225 being associated with the vendor. Server device 220 may transmit a permission indicating that mobile device 210 should establish the connection with M2M device 225 to mobile device 210. Based on receiving the permission, mobile device 210 may send a pair request to M2M device 225. M2M device 225 may establish the connection with mobile device 210 based on the pair request.

Process 900 may include transmitting the data related to the user interaction to the mobile device (block 925). M2M device 225 may transmit the data related to the user interaction to mobile device 210 via the established connection. In some implementations, M2M device 225 may transmit the data related to the user interaction to mobile device 210 using one or more wireless communication protocols, such as, for example, near field communication (NFC), IEEE 802.15 (e.g., Bluetooth), and/or IEEE 802.11 (e.g., Wi-Fi). In some implementations, the data related to the user interaction may include information identifying M2M device 225 and/or client device 220. For example, the data related to the user interaction may include an identifier or other information identifying M2M device 225 and/or client device 220.

Process 900 may include receiving data from the M2M device (block 930, FIG. 9B). For example, mobile device 210 may receive data related to the user interaction from M2M device 225. In some implementations, mobile device 210 may store the received data in a memory (e.g., memory 330). For example, mobile device 210 may determine that a network for transmitting the data to server device 230 is unavailable. Mobile device 210 may store the data in a memory associated with mobile device 210 based on the network being unavailable.

Process 900 may include transmitting the data to the server device (block 935). For example, mobile device 210 may establish a connecting to a network for transmitting data to server device 230 and may transmit the data to server device 230 via the established connection. In some implementations, the data transmitted to server device 230 may include the information identifying client device 220 and/or M2M device 225, the information related to the user interaction with client device 220, and/or information identifying mobile device 210 and/or a user of mobile device 210.

In some implementations, mobile device 210 may transmit the data to server device 230 based on preference information associated with a user of mobile device 210. For example, in response to receiving the data from M2M device 225, mobile device 210 may access preference information associated with a user of mobile device 210. Mobile device 210 may determine one or more preferences of the user associated with transmitting data to server device 230 based on the preference information. Mobile device 210 may transmit the data to server device 230 based on the one or more preferences.

In some implementations, the one or more preferences may relate to M2M device 225 and/or client device 220. For example, the received data may include an identifier associated with M2M device 225 and/or client device 220. Mobile device 210 may parse the received data to determine the identifier. Mobile device 210 may determine a preference identifying one or more M2M devices 225 and/or client devices 220 for which a user of mobile device 210 desires to transmit data. In some implementations, the preference may identify one or more M2M devices 225 and/or client devices 220 that are owned and/or frequently interacted with by the user. In some implementations, the preference may indicate one or more M2M devices 225 and/or client devices 220 that offer incentives for transmitting data to server device 230. Mobile device 210 may determine that the identifier is associated with an M2M device 225 and/or a client device 220 for which the user desires to transmit data and may transmit the data to server device 230.

In some implementations, the one or more preferences may relate to a type of network. For example, mobile device 210 may determine a preference of the user indicating that mobile device 210 is to transmit data to server device 230 via a particular type of network (e.g., a WiFi network, a cellular network associated with a particular service provider, etc.). Mobile device 210 may transmit the data to server device 230 via the particular type of network. In some implementations, mobile device 210 may determine that the particular type of network is not currently available for transmitting the data to server device 230. Mobile device 210 may store the data in a memory. Mobile device 210 may subsequently determine that the particular type of network is available for transmitting the data to server device 230. Mobile device 210 may retrieve the data from the memory and may transmit the data to server device 230 via the particular type of network.

Process 900 may include receiving data from the mobile device (block 940, FIG. 9C). For example, server device 230 may receive data related to a user interaction with client device 220 from mobile device 210. In some implementations, the received data may include the information identifying client device 220 and/or M2M device 225, the information related to the user interaction with client device 220, and/or information identifying mobile device 210 and/or a user of mobile device 210. Server device 210 may parse the received data to determine the information identifying client device 220 and/or M2M device 225, the information related to the user interaction with client device 220, and/or information identifying mobile device 210 and/or a user of mobile device 210 and may store the received data in a memory. In some implementations, server device 230 may store one or more portions of the received data in one or more data structures (e.g., one or more data structures 400). For example, server device 230 may store one or more portions of the received data in a data structure associated with mobile device 210, a user of mobile device 210, client device 220, and/or M2M device 225.

Process 900 may include determining an occurrence of an event (block 945). For example, server device 230 may determine an occurrence of an event based on the data related to the user interacting with client device 220. In some implementations, the occurrence of the event may be associated with the user interacting with client device 220.

For example, the received data may include inventory data indicating a change in an inventory of client device 220. Server device 230 may access information associated with client device 220 (e.g., a data structure 400 associated with client device 220). Server device 230 may update an inventory of client device 220 based on the inventory data. The information associated with client device 220 may indicate that when a quantity of a product is reduced to a particular quantity (e.g., a minimum quantity), server device 230 is to send a notification to a user device associated with client device 220. Based on the updated inventory, server device 230 may determine that the user interacting with client device 220 has resulted in the quantity of the product being reduced to the particular quantity. Server device 230 may send a notification that includes information indicating that the quantity of the product has been reduced to the particular quantity to M2M application device 240.

In some implementations, the occurrence of the event may be associated with mobile device 210 transmitting the data to server device 230. For example, server device 230 may access information associated with mobile device 210 (e.g., data structure 400). The information associated with mobile device 210 may indicate that mobile device 210 is associated with a program that offers incentives based on an amount of data transmitted to server device 230. Server device 230 may determine an amount of data transmitted to server device 230 by mobile device 210 and may update a total amount of data transmitted to server device 230 by mobile device 210 based the determined amount of data.

In some implementations, server device 230 may send information associated with the updated total amount of data to mobile device 210 and/or a M2M application device 240 associated with a vendor and/or other entity implementing the program. For example, server device 230 may determine that a user of mobile device 210 qualifies for a particular incentive based on the updated total amount of data. Server device 230 may send information identifying the updated total amount of data and/or information indicating that the user qualifies for the particular incentive to mobile device 210 and/or the M2M application device 240 associated with the vendor and/or other entity.

While FIGS. 9A-9C show process 900 as including a particular quantity and arrangement of blocks, in some implementations, process 900 may include fewer blocks, additional blocks, or a different arrangement of blocks. Additionally, or alternatively, some of the blocks may be performed in parallel.

FIGS. 10A-10G are diagrams that illustrate an example 1000 of the process described above with respect to FIGS. 9A-9C. For example 1000, assume that a user interacts with a treadmill to perform an exercise. Assume that mobile device 210 is strapped to the arm of the user and that the user uses mobile device 210 to listen to music as the user performs the exercise. Assume that the treadmill includes M2M device 225 that determines fitness data associated with the user performing the exercise. Assume that the user has an account with a service provider that provides a fitness application for collecting and providing fitness data. Further, assume that mobile device 210 includes a mobile device gateway application that is configured to receive fitness data from M2M device 225 and transmit the fitness data to server device 230.

Figure 10A:
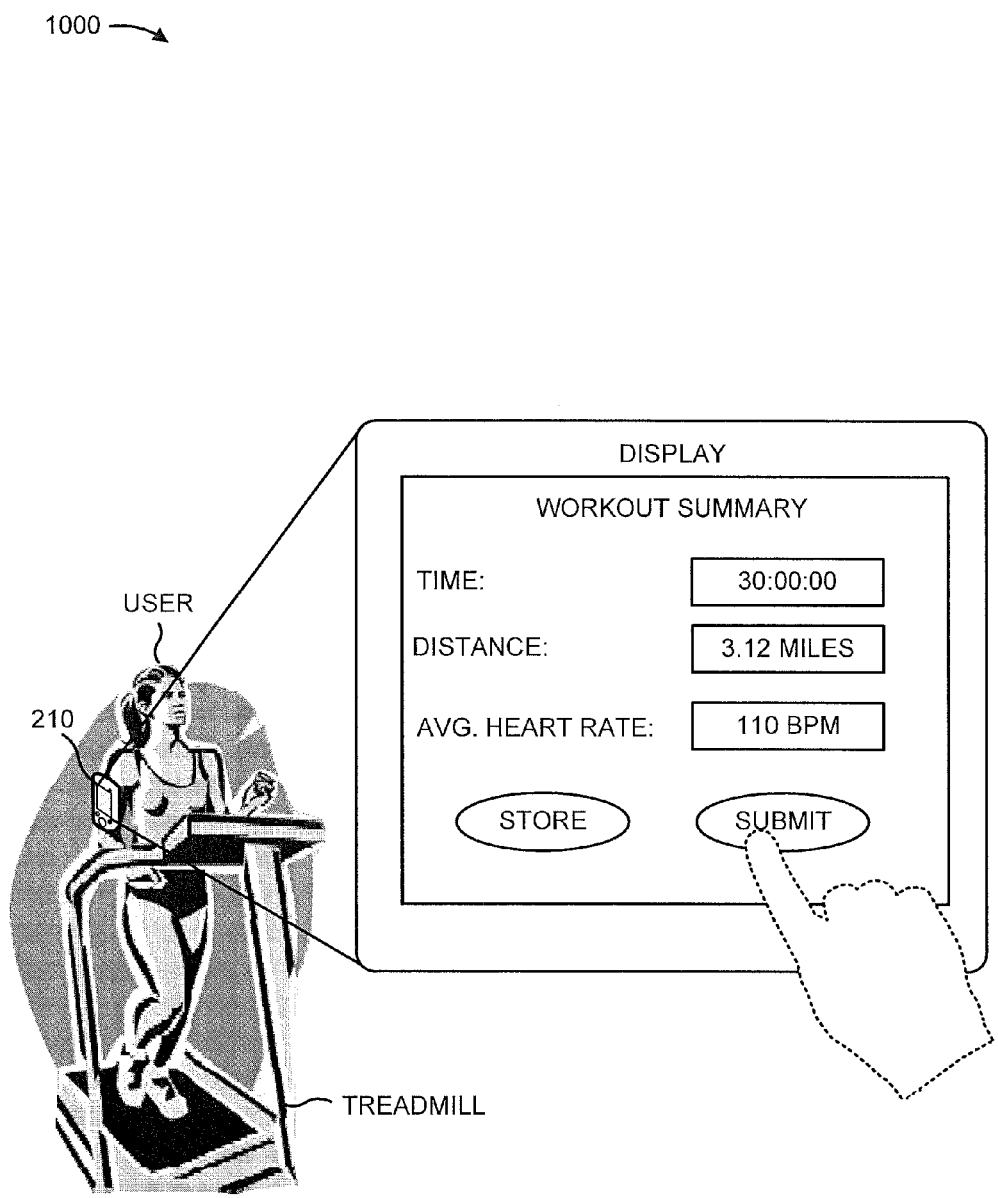

Referring now to FIG. 10A, M2M device 225 may determine that the user has completed performing the exercise. In response to the user completing the exercise, M2M device 225 may cause a summary of the determined fitness data to be displayed to the user via a display of the treadmill. The summary of the determined fitness data may include an option for causing the fitness data to be stored locally (e.g., in a memory of the treadmill and/or mobile device 210) and an option for causing the fitness data to be transmitted to server device 230. As shown in FIG. 10A, the user selects the option for causing the fitness data to be transmitted to server device 230.

Figure 10B:
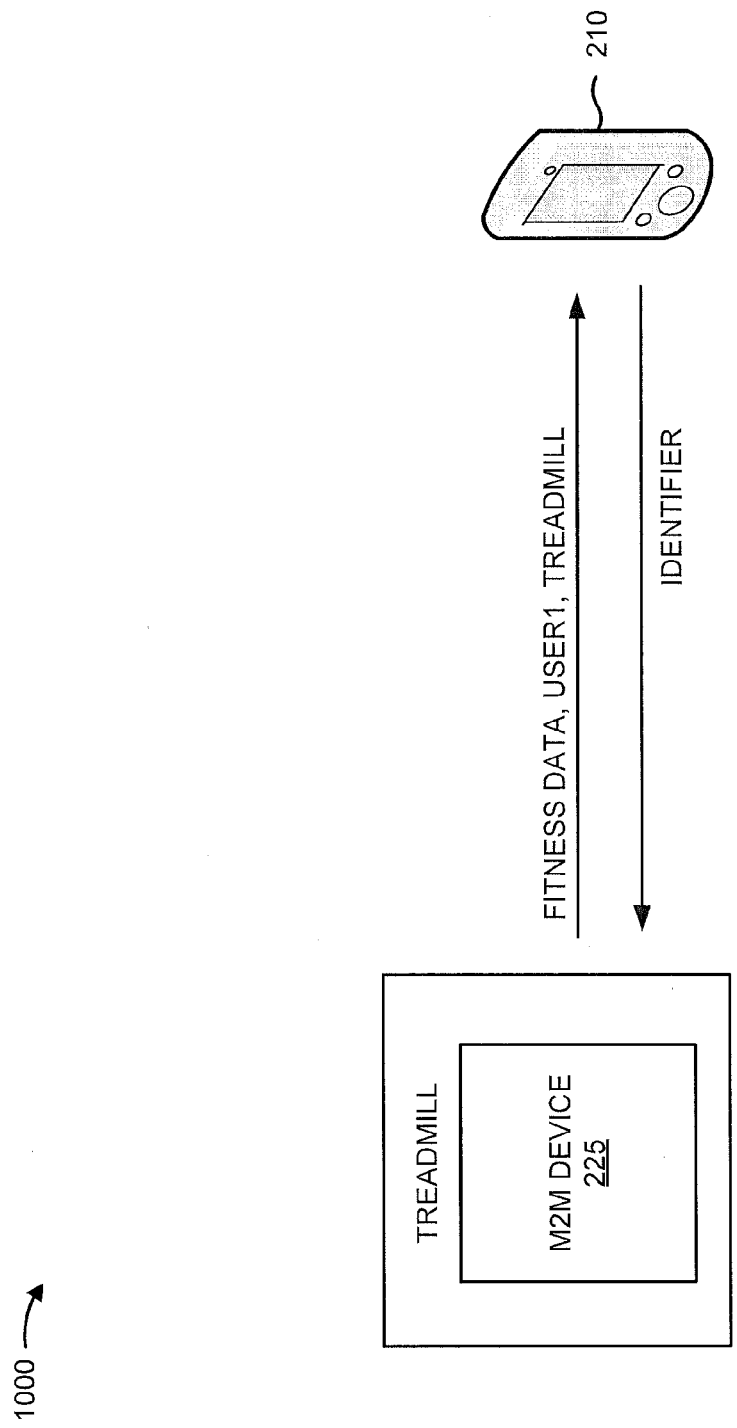

Referring now to FIG. 10B, mobile device 210 may transmit an identifier that is received by M2M device 225. Based on the identifier, M2M device 225 may establish a connection with mobile device 210 and transmit fitness data, information identifying the user ("USER1") to mobile device 210, and information identifying the treadmill ("TREADMILL") via the established connection. Mobile device 210 may receive the fitness data, the information identifying the user, and the information the treadmill from M2M device 225.

Figure 10C:
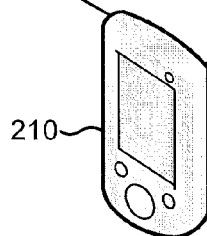

Referring now to FIG. 10C, mobile device 210 may access a data structure that includes information for determining server devices 230 associated with client devices 220. Mobile device 210 may determine that the treadmill is associated with a particular server device 230 ("SERVER1"). Referring now to FIG. 10D, mobile device 210 may transmit the fitness data and the information identifying the user to SERVER1 via network 250. SERVER1 may receive the fitness data and the information identifying the user.

Referring now to FIG. 10E, SERVER1 may access a data structure associated with the user based on the information identifying the user. The data structure may include information for determining an occurrence of an event related to the user interacting with the treadmill and information identifying an action to be performed upon the occurrence of the event. Based on receiving the fitness data, SERVER1 may determine to send the fitness data and information identifying the user to client device 240 ("FITNESS APPLICATION SERVER").

Figure 10F:
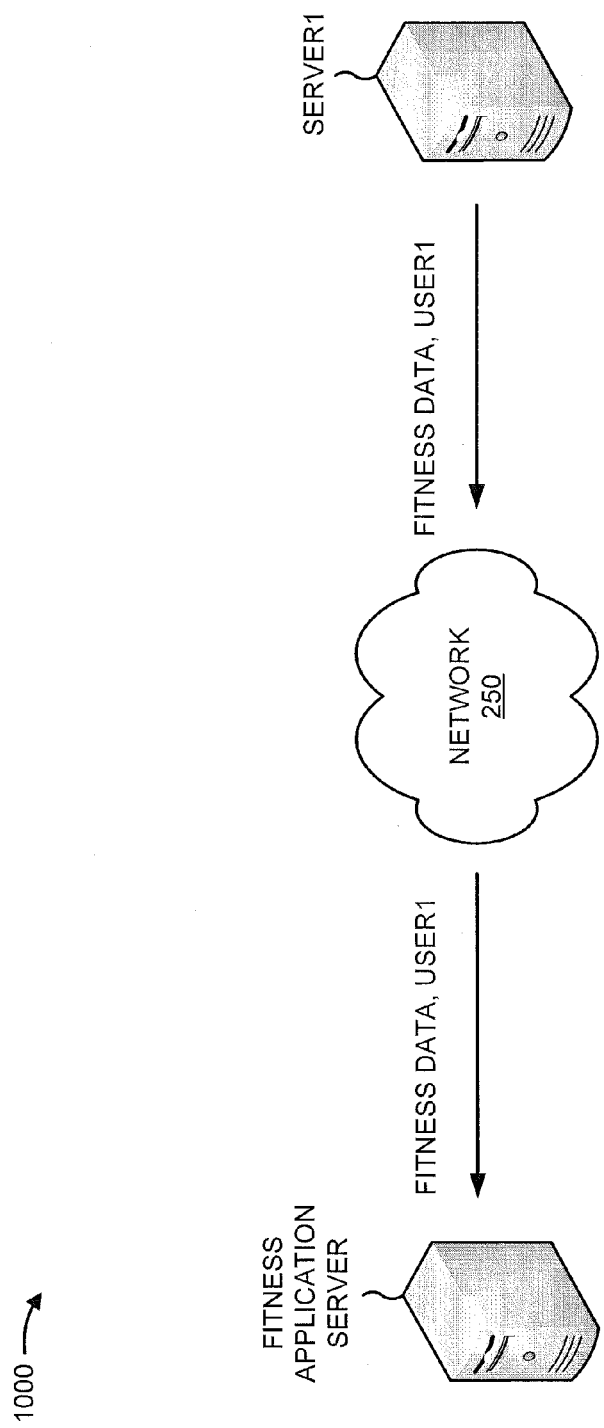
Figure 10G:
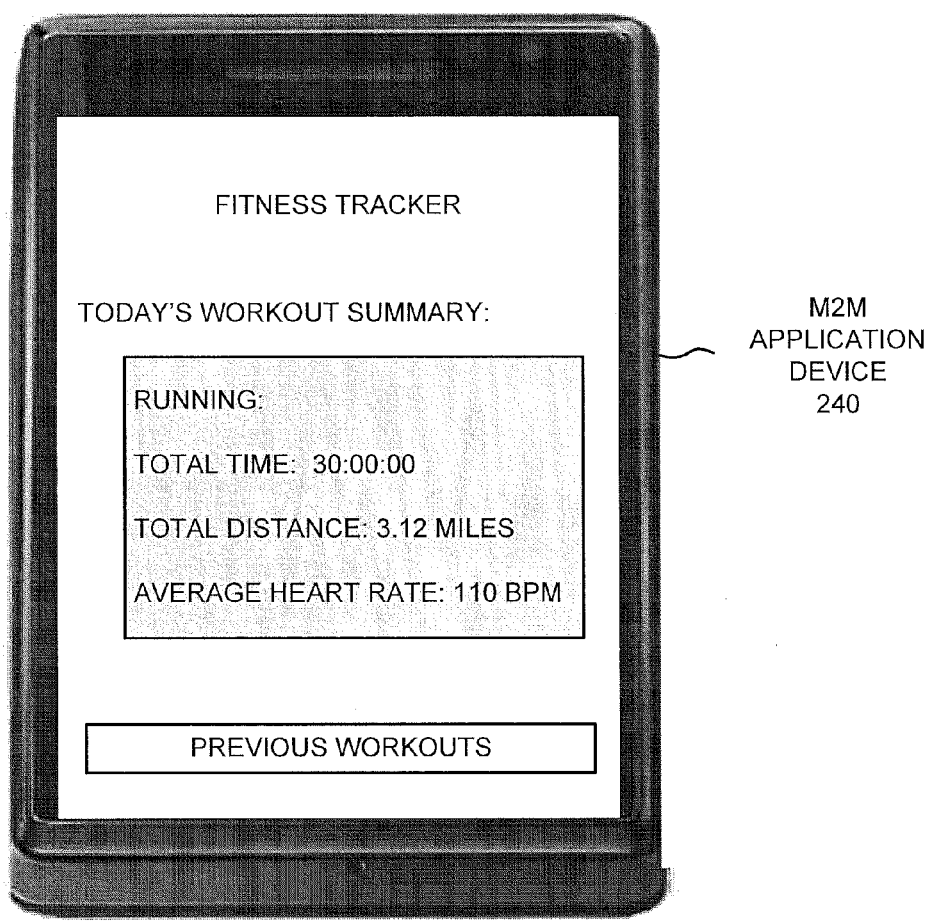

Referring now to FIG. 10F, FITNESS APPLICATION SERVER may receive the fitness data and the information identifying the user from SERVER1. FITNESS APPLICATION SERVER may process the fitness data and may allow the user to access the processed fitness data via a M2M application device 240 associated with the user as shown in FIG. 10G.

As indicated above, FIGS. 10A-10G are provided merely as an example. Other examples are possible and may differ from what was described with regard to FIGS. 10A-10G.

FIGS. 11A-11D are diagrams that illustrate an example 1100 of the process described above with respect to FIGS. 9A-9C. For example 1100, assume that a user carrying mobile device 210 interacts with a vending machine to purchase a product. Assume that the vending machine includes M2M device 225 that determines inventory data associated with the user purchasing the product. Further, assume that mobile device 210 includes a mobile device gateway application that is configured to act as a gateway device for M2M device 225.

Figure 11A:
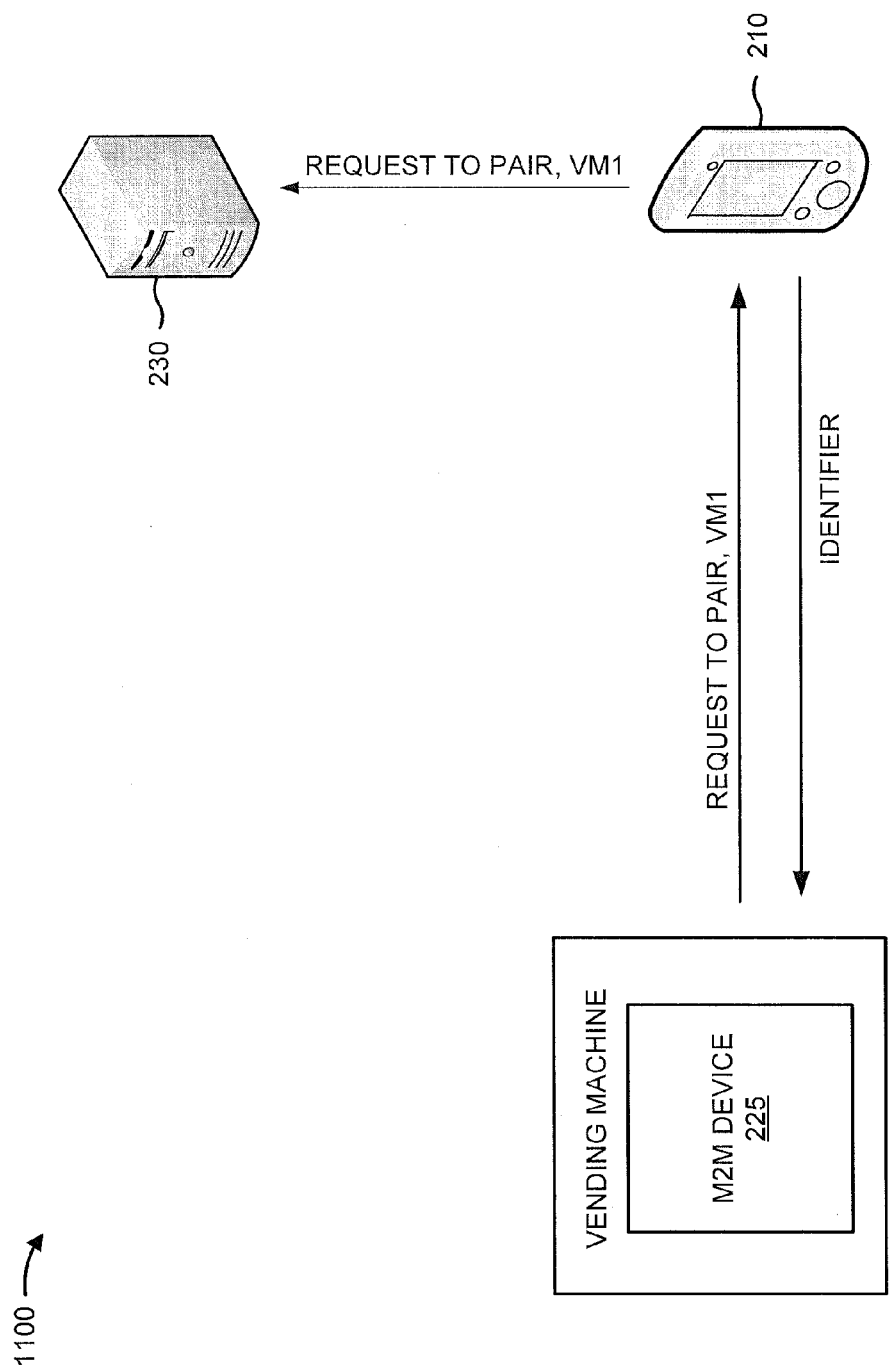
Figure 11B:
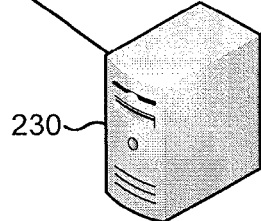

Referring now to FIG. 11B, mobile device 210 may transmit an identifier that is received by M2M device 225. Based on the identifier, M2M device 225 may send a request to establish a connection with mobile device 210 that includes information identifying the vending machine ("VM1"). Mobile device 210 may receive the request and the information identifying the vending machine from M2M device 225. Mobile device 210 may transmit the request and the information identifying the vending machine to server device 230.

Referring now to FIG. 11B, server device 230 may receive the request and the information identifying the vending machine. Server device 230 may access a data structure identifying approved vendors to determine whether mobile device 210 should establish the connection with M2M device 225 and to determine where mobile device 210 is to send data received from M2M device 225. Based on the information included in the data structure, server device 230 may determine that mobile device 210 should establish a connection with M2M device 225 and should transmit received data to a particular server device ("SERVER1").

Figure 11C:
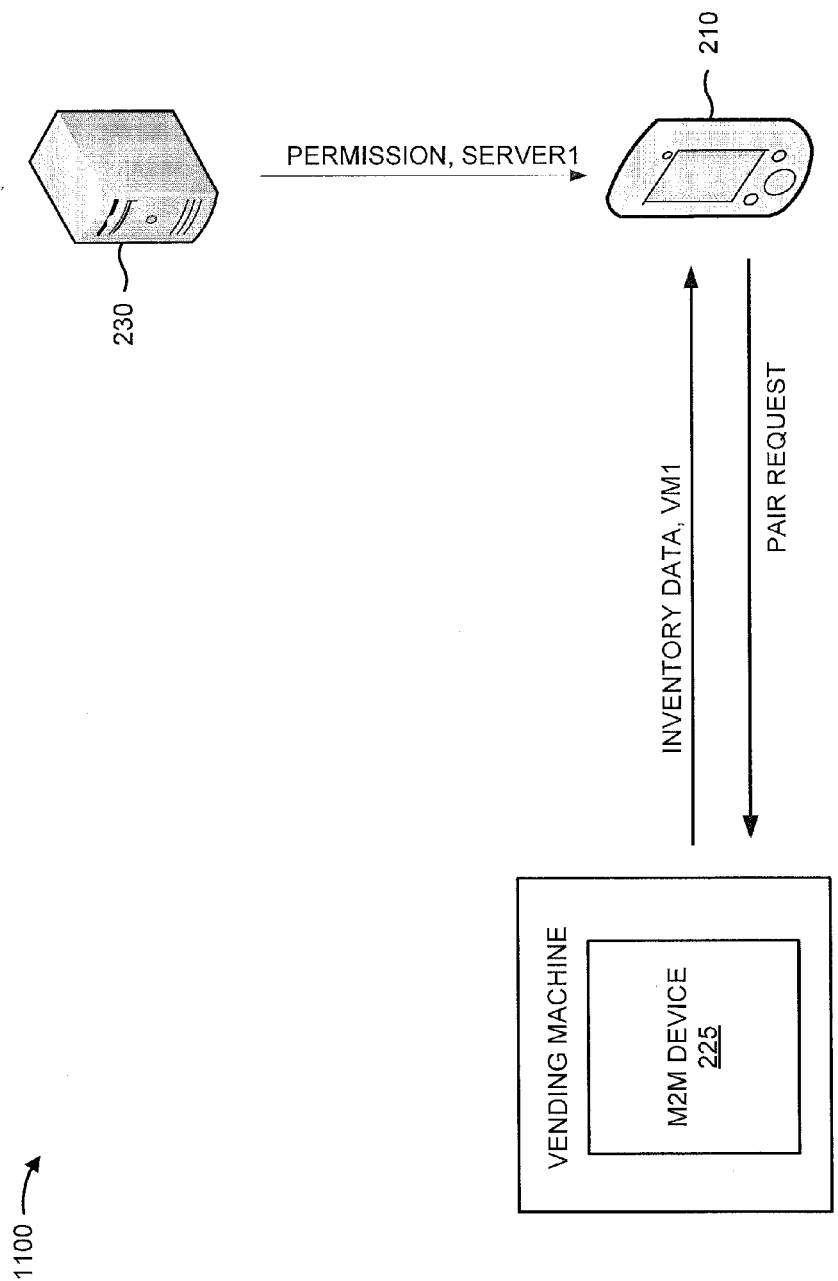

Referring now to FIG. 11C, server device 230 may transmit a permission and information identifying the particular server device to mobile device 210. Mobile device 210 may receive the permission and may send a request to establish a connection to M2M device 225. M2M device 225 may receive the request and may establish a connection with mobile device 210. M2M device 225 may transmit the inventory data and information identifying the vending device to mobile device 210 via the established connection.

Figure 11D:
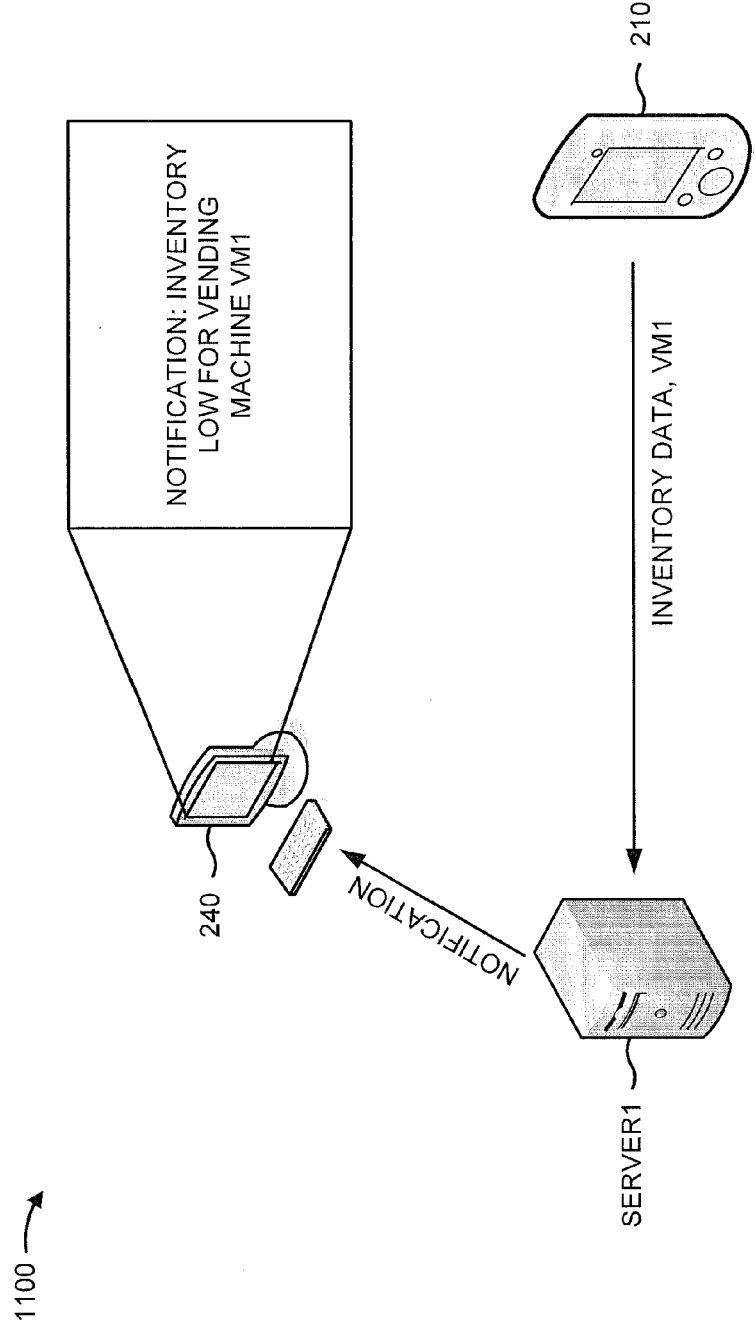

Referring now to FIG. 11D, based on the information received from server device 230, mobile device 210 may send the inventory data and the information identifying the vending machine to the particular SERVER1. SERVER1 may receive the inventory data and may process the inventory data to determine a current inventory of the vending machine. SERVER1 Based on the current inventory of the vending machine, SERVER1 may send a notification to a M2M application device 240 associated with the vending machine. As shown in FIG. 11D, the notification may alert a user of M2M application device 240 that the inventory in the vending machine is low.

As indicated above, FIGS. 11A-11D are provided merely as an example. Other examples are possible and may differ from what was described with regard to FIGS. 11A-11D.

The foregoing description provides illustration and description, but is not intended to be exhaustive or to limit the embodiments to the precise form disclosed. Modifications and variations are possible in light of the above teachings or may be acquired from practice of the implementations.

To the extent the aforementioned embodiments collect, store, or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

As used herein, the term device is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A system, comprising:
a machine-to-machine device; and
a mobile device,
the machine-to-machine device to:
determine an occurrence of a user performing an exercise with a fitness device causing the fitness device to perform a particular action;
determine fitness data representing a performance of the exercise by the user with the fitness device;
provide, for display, a summary of the fitness data;
detect the mobile device,
the mobile device being associated with the user, and including an application for sending the fitness data, received from the machine-to-machine device, to a server associated with the machine-to-machine device;
determine, based on detecting the mobile device, a signal strength associated with the mobile device;
determine, based on the signal strength, that the mobile device is capable of acting as a gateway for the machine-to-machine device;
establish a first connection with the mobile device based on the mobile device including the application and based on determining that the mobile device is capable of acting as the gateway; and
transmit, based on establishing the first connection, the fitness data to the mobile device; and
the mobile device to:
receive the fitness data from the machine-to-machine device;
store the fitness data,
wherein storing the fitness data is based on a second connection to a network, for transmitting the fitness data to the server, being unavailable; transmit the fitness data to the server,
wherein transmitting the fitness data to the server is based on a determination that the second connection to the network is available and based on one or more preferences being set via the application, the second connection being between the mobile device and the network, and the one or more preferences including a preference to transmit the fitness data based on the fitness data being associated with a rewards program and based on the machine-to-machine device being identified as offering the rewards program,
the rewards program providing an incentive to the user based on an amount of data transmitted via the mobile device; and
receive, from the server, information indicating an updated total amount of data transmitted to the server by the mobile device,
the updated total amount of data including an amount of the transmitted fitness data.

2. The system of claim 1, wherein the fitness data includes information related to at least one of:
a heartbeat or pulse of the user,
a length of time that the user performed the exercise, or
a speed at which the user performed the exercise.

3. The system of claim 1, wherein the machine-to-machine device is further to:
determine that the mobile device is transmitting an identifier associated with the application; and
wherein, when detecting the mobile device, the machine-to-machine device is to:
detect the mobile device based on determining that the mobile device is transmitting the identifier.

4. The system of claim 3, wherein, when determining that the mobile device is transmitting the identifier, the machine-to-machine device is to:
determine that the mobile device is transmitting the identifier prior to the fitness device performing the particular action.

5. The system of claim 3, wherein, when determining the signal strength, the machine-to-machine device is to:
determine the signal strength based on receiving the identifier transmitted by the mobile device.

6. The system of claim 5, wherein the machine-to-machine device is further to:
determine a distance of the mobile device from the machine-to-machine device based on the signal strength, and
wherein, when determining that the mobile device is capable of acting as the gateway, the machine-to-machine device is to:
determine that the mobile device is capable of acting as the gateway based on the distance of the mobile device from the machine-to-machine device.

7. A non-transitory computer-readable medium storing instructions, the instructions comprising:
one or more first instructions that, when executed by a first processor of a system, cause the first processor to:
determine an occurrence of a user performing an exercise with a fitness device causing the fitness device to perform a particular action;
determine fitness data representing a performance of the exercise by the user with the fitness device;
provide, for display, a summary of the fitness data;
detect a mobile device that includes an application for sending the fitness data received from a machine-to-machine device to a server associated with the machine-to-machine device;
determine, based on detecting the mobile device, a signal strength associated with the mobile device;
determine, based on the signal strength, that the mobile device is capable of acting as a gateway for the machine-to-machine device;
establish a connection between the machine-to-machine device and the mobile device based on the mobile device including the application and based on determining that the mobile device is capable of acting as the gateway; and
transmit, based on establishing the connection, the fitness data from the machine-to-machine device to the mobile device; and
one or more second instructions that, when executed by a second processor of the system, cause the second processor to:
receive, by the mobile device, the fitness data from the machine-to-machine device, the mobile device comprising the second processor;
store, at the mobile device, the fitness data,
wherein storing the fitness data is based on a second connection to a network, for transmitting the fitness data to the server, being unavailable;
transmit the fitness data from the mobile device to the server,
wherein transmitting the fitness data from the mobile device to the server is based on a determination that the second connection to the network is available and based on one or more preferences being set via the application,
the second connection being between the mobile device and the network, and
the one or more preferences including a preference to transmit the fitness data based on the fitness data being associated with a rewards program and based on the machine-to-machine device being identified as offering the rewards program,
the rewards program providing an incentive to the user based on an amount of data transmitted via the mobile device; and
receive, by the mobile device from the server, information indicating an updated total amount of data transmitted to the server by the mobile device,
the updated total amount of data including an amount of the transmitted fitness data.

8. The non-transitory computer-readable medium of claim 7, wherein the fitness data includes information related to at least one of:
a heartbeat or pulse of the user,
a length of time that the user performed an exercise, or
a speed at which the user performed the exercise.

9. The non-transitory computer-readable medium of claim 7, wherein the one or more first instructions, when executed by the first processor, further cause the first processor to:
determine that the mobile device is transmitting an identifier associated with the application; and
wherein the one or more first instructions, that cause the first processor to detect the mobile device, cause the first processor to:
detect the mobile device based on determining that the mobile device is transmitting the identifier.

10. The non-transitory computer-readable medium of claim 9, wherein the one or more first instructions, that cause the first processor to determine that the mobile device is transmitting the identifier, cause the first processor to:
determine that the mobile device is transmitting the identifier prior to the fitness device performing the particular action.

11. The non-transitory computer-readable medium of claim 9, wherein the one or more first instructions, that cause the first processor to determine the signal strength, cause the first processor to:

determine the signal strength based on receiving the identifier transmitted by the mobile device.

12. The non-transitory computer-readable medium of claim 11, wherein the one or more first instructions, when executed by the first and second processors, further cause the first processor to:
determine a distance of the mobile device from the machine-to-machine device based on the signal strength, and
wherein the one or more first instructions, that cause the first processor to determine that the mobile device is capable of acting as the gateway, cause the first processor to:
determine that the mobile device is capable of acting as the gateway based on the distance of the mobile device from the machine-to-machine device.

13. A method comprising:
determining, by a machine-to-machine device, an occurrence of a user performing an exercise with a fitness device causing the fitness device to perform a particular action;
determining, by the machine-to-machine device, fitness data representing a performance of the exercise by the user with the fitness device;
providing, for display and by the machine-to-machine device, a summary of the fitness data;
detecting, by the machine-to-machine device, a mobile device of the system,
the mobile device being associated with the user, and including an application for sending the fitness data, received from the machine-to-machine device, to a server associated with the machine-to-machine device;
determining, by the machine-to-machine device and based on detecting the mobile device, a signal strength associated with the mobile device;
determining, by the machine-to-machine device and based on the signal strength, that the mobile device is capable of acting as a gateway for the machine-to-machine device;
establishing, by the machine-to-machine device, a first connection between the machine-to-machine device and the mobile device based on the mobile device including the application and based on determining that the mobile device is capable of acting as the gateway;
transmitting, by the machine-to-machine device and based on establishing the first connection, the fitness data from the machine-to-machine device to the mobile device;
receiving, by the mobile device, the fitness data from the machine-to-machine device;
storing, by the mobile device, the fitness data at the mobile device,
wherein storing the fitness data at the mobile device is based on a second connection to a network, for transmitting the fitness data to the server, being unavailable; transmitting, by the mobile device, the fitness data from the mobile device to the server,
wherein transmitting the fitness data from the mobile device to the server is based on a determination that the second connection to the network is available and based on one or more preferences being set via the application,
the second connection being between the mobile device and the network, and
the one or more preferences including a preference to transmit the fitness data based on the fitness data being associated with a rewards program and based on the machine-to-machine device being identified as offering the rewards program,
the rewards program providing an incentive to the user based on an amount of data transmitted via the mobile device; and
receiving, by the mobile device from the server, information indicating an updated total amount of data transmitted to the server by the mobile device,
the updated total amount of data including an amount of the transmitted fitness data.

14. The method of claim 13, wherein the fitness data includes information related to at least one of:
a heartbeat or pulse of the user,
a length of time that the user performed an exercise, or
a speed at which the user performed the exercise.

15. The method of claim 13, further comprising:
determining that the mobile device is transmitting an identifier associated with the application; and
wherein detecting the mobile device comprises:
detecting the mobile device based on determining that the mobile device is transmitting the identifier.

16. The method of claim 15, wherein determining that the mobile device is transmitting the identifier comprises:
determining that the mobile device is transmitting the identifier prior to the fitness device performing the particular action.

17. The method of claim 13, further comprising:
receiving a pair request, from the mobile device, to establish the first connection; and
wherein establishing the first connection comprises:
establishing the first connection based on receiving the pair request.

18. The method of claim 15, wherein determining the signal strength comprises:
determining the signal strength based on receiving the identifier transmitted by the mobile device.

19. The method of claim 18, further comprising:
determining a distance of the mobile device from the machine-to-machine device based on the signal strength; and
wherein determining that the mobile device is capable of acting as the gateway comprises:
determining that the mobile device is capable of acting as the gateway based on the distance of the mobile device from the machine-to-machine device.

20. The system of claim 1, wherein the machine-to-machine device is further to:
receive a pair request, from the mobile device, to establish the first connection;
wherein, when establishing the first connection, the machine-to-machine device is to:
establish the first connection based on receiving the pair request; and
wherein, when transmitting the fitness data, the machine-to-machine device is to:
transmit the fitness data based on establishing the first connection.

* * * * *